(12) United States Patent
Mukesh

(10) Patent No.: US 9,392,066 B2
(45) Date of Patent: Jul. 12, 2016

(54) CONNECTION PERSISTENCE ACROSS SERVER FARMS IN A NETWORK ENVIRONMENT

(71) Applicant: CISCO TECHNOLOGY, INC., San Jose, CA (US)

(72) Inventor: Lodaya Varun Mukesh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 578 days.

(21) Appl. No.: 13/869,659

(22) Filed: Apr. 24, 2013

(65) Prior Publication Data

US 2014/0325080 A1    Oct. 30, 2014

(51) Int. Cl.
*G06F 15/16* (2006.01)
*H04L 29/08* (2006.01)
*H04L 29/06* (2006.01)

(52) U.S. Cl.
CPC .......... *H04L 67/145* (2013.01); *H04L 67/1027* (2013.01); *H04L 63/0236* (2013.01)

(58) Field of Classification Search
None
See application file for complete search history.

(56) References Cited

U.S. PATENT DOCUMENTS

| | | | | |
|---|---|---|---|---|
| 6,199,111 | B1* | 3/2001 | Hara ........................ | G06F 9/465 709/223 |
| 8,260,926 | B2 | 9/2012 | Narayana et al. | |
| 2004/0093406 | A1* | 5/2004 | Thomas .............. | H04L 67/1008 709/224 |
| 2007/0083645 | A1* | 4/2007 | Roeck ................. | G06F 11/2028 709/224 |
| 2007/0136311 | A1* | 6/2007 | Kasten ................ | H04L 67/1008 |
| 2009/0222583 | A1* | 9/2009 | Josefsberg .......... | H04L 67/1002 709/245 |
| 2010/0250718 | A1* | 9/2010 | Igarashi .................. | H04L 45/00 709/221 |
| 2012/0179838 | A1* | 7/2012 | Tanimoto ............ | H04L 12/4675 709/238 |

OTHER PUBLICATIONS

"Cisco Release Note for the Cisco Application Control Engine Module, New Software Features in Version A5(2.0)," Cisco Systems, Inc., San Jose, CA; pp. 25-36, Feb. 28, 2013 http://www.cisco.com/en/US/docs/interfaces_modules/services_modules/ace/vA5_2_x/release/note/ACE_mod_rn_A52x.html.

Cisco Product Guide, "ACE Client and Servers Hitting the Same VIP: Document ID 107398," Cisco Systems, Inc., Jul. 14, 2008; 9 pages http://www.cisco.com/en/US/products/hw/modules/ps2706/products_configuration_example09186a00809c6ef5.shtml.

Cisco Data Sheet, "Cisco ACE30 Application Control Engine Module," Cisco Systems, Inc., Jun. 2012; 6 pages http://www.cisco.com/en/US/prod/collateral/modules/ps2706/ps6906/data_sheet_c78_632383.html.

(Continued)

*Primary Examiner* — Thomas Dailey
(74) *Attorney, Agent, or Firm* — Patent Capital Group

(57) ABSTRACT

An example method for connection persistence across server farms in a network environment is provided and includes associating a first real server with a first server farm attached to a first virtual Internet Protocol address (VIP), associating a second real server with a second server farm attached to a second VIP, and linking the first real server with the second real server in a particular group. The first real server is configured to service a first connection from a client to the first VIP in a network environment, the second real server is configured to service a second connection from the client to the second VIP in the network environment, and the method further includes facilitating connection persistence of the first connection with the second connection across the first server farm and the second server farm.

19 Claims, 34 Drawing Sheets

(56) References Cited

OTHER PUBLICATIONS

"Chapter 2: Configuring Real Servers and Server Farms," from *Cisco 4700 Series Application Control Engine Appliance Server Load-Balancing Configuration Guide*, pp. 35-82; Cisco Systems, Inc., San Jose, CA, Nov. 2007; http://www.cisco.com/en/US/docs/app_ntwk_services/data_center_app_services/ace_appliances/vA1_7_/configuration/slb/guide/preface.html (date unknown).

Cisco White Paper, "Connection Handling in the Cisco Application Control Engine (ACE30) Module," Cisco Systems, Inc., 2011; 15 pages http://www.cisco.com/en/US/prod/collateral/modules/ps2706/ps6906/White_Paper_Connection_Handling_within_the_Cisco_Application_Control_Engine_Module_Hardware_ps7027_Products_White_Paper.html.

"Citrix: How to Set HTTP and HTTPS Persistence without Using Persistency Groups," Citrix Document ID: CTX124628, Citrix Systems, Inc., Mar. 10, 2012, 8 pages http://support.citrix.com/article/CTX124628.

"Citrix: About Persistence," Product Documentation, Citrix Systems, Inc., Mar. 16, 2012; 3 pages http://support.citrix.com/proddocs/topic/netscaler-load-balancing-92/ns-lb-persistence-about-con.html.

"Chapter 3: Key Concepts for System Administrator and Application Developers," from *Sun Cluster Concepts Guide for Solaris OS: Load balancing policies*, Oracle Corporation, 2006 Oracle Corporation, 55 pages http://docs.oracle.com/cd/E19787-01/819-2969/x-17ega/index.html.

* cited by examiner

```
typedef struct {
    cm_context_id_t    context_id;
    char
buddy_sticky_group_name[TN_MAX_NAME_LEN+1];
    list_head_t        sticky_group_list; //list of
sticky groups configured
    uint32             buddy_timeout;
    uint32_t           v4_netmask;
    uint8_t            prefix_len;
    uint8              flags;
    uint32_t           cfg_flag;
    int                buddy_sticky_group_id;
    int                sticky_group_count;
} cm_buddy_sticky_group_t;
```

FIG. 8A — 80

```
typedef struct {
    cm_context_id_t    context_id;
    char
buddy_sfarm_real_name[TN_MAX_NAME_LEN+1];
    list_head_t        sfarm_real_list; //list of
real servers configured
    uint8              flags;
    uint32_t           cfg_flag;
    int                buddy_sfarm_real_id;
} cm_buddy_sfarm_real_t;
```

```
typedef struct {
    cm_context_id_t      context_id;                    84
    char                 sticky_group_name[TN_MAX_NAME_LEN+1];
    uint8                flags;
    int                  sticky_group_id;
    cm_sticky_type_t     sticky_type;
    uint32               sticky_timeout;
        cm_sticky_cfg_t  sticky_cfg;
        list_head_t      group_static_sticky_list;
        list_head_t      group_slb_policy_list_r;
        list_head_t      sfarm_list;
        list_head_t      bkup_sfarm_list;
        list_head_t      buddy_list; //buddy group for this group
        bool             bkup_sticky;
        .
        .
        .
        bool             buddy_sticky;
        bool             buddy_sticky_change;
        bool             rpt_stkgrp_change_to_lb;
        bool             sticky_backup;
        bool             sticky_backup_change;
        cm_sticky_param6_t  sticky_cfg6;
        cm_sticky_valid_t   is_valid;
} cm_sticky_group_t;
```

FIG. 8D

```
typedef struct _cm_sfarm_real_t
{
    real_data_t              real_cfg;
    cm_sfarm_t               *sfarm;
    struct _cm_real_state    *state;                    86
    struct _cm_sfarm_real_t  *bkup_real;
    list_head_t              primary_real_list;
    list_head_t              real_to_probe_list;
    list_head_t              sf_to_probe_inst_list;
    list_head_t              real_to_probe_inst_list;
    list_head_t              buddy_sfarm_real_list; // list of
BUDDY-REAL
/* Additional Attributes - attributes that exist on the rserver config or sfarm
config can be retrieved by looking up the structure with rserver or sfarm index
above in the real_cfg structure */
    uint8                    rs_weight;
    uint32                   rs_max_conns;
    uint32                   rs_min_conns;
    .
    .
    .
    bool                     ixp3_inband_threshold;
    bool                     buddy_real;
    uint32_t                 ixp_failedInband[4];
    real_vmload_t            vmload;
} cm_sfarm_real_t;
```

FIG. 9A

```
typedef struct _LbSticky_StickyContext_t                90
{
        .
        .
        .
        buddy_sticky_type_t        *buddy_sticky;
        buddy_real_server_type_t   *buddy_real;
        .
        .
} LbSticky_StickyContext_t
```

FIG. 9B

```
typedef struct _buddy_sticky_type_t           92
{
        DINode_t                buddyStickyList;
        DIList_t                stickyGroupList;
        LbSticky_StickyList_t   stickyEntryLru;
        uint32_t                timeout;
        uint32_t                v4_netmask;
        buddy_sticky_id_t       buddy_id;
        uint8_t                 prefix_len;
        BOOL                    bTimeoutActiveConns;
        BOOL                    bActive;
} buddy_sticky_type_t;
```

FIG. 9C
```
typedef struct _buddy_real_server_type_t                94
{
    DlNode_t              buddyRealServerList;
    DlList_t              realServerList;
    buddy_real_server_id_t  buddy_id;
    BOOL                  bActive;
} buddy_real_server_type_t;
```

FIG. 9D
```
                                                         96
typedef struct _lb_buddy_real_server_info_t
{
    DlNode_t    realServerLink;
    uint16_t    realServerId;
    uint16_t    buddyRealServerId;
    uint16_t    serverfarmId;
    uint16_t    padding[1];
} lb_buddy_real_server_info_t;
```

FIG. 9E

```
typedef struct _lb_sticky_group_stats_t
{
  DlNode_t timeNodeLink;
  LbSticky_StickyList_t stickyEntryLru;
  uint32_t stickyEntryLruCount;
  uint32_t numStickyEntries;
  uint32_t activeConnCount;
  lb_sticky_group_id_t stickyGroupId;
  BIT_FIELD16( bActive );
  BIT_FIELD16( bRemoveInProgress );
  BIT_FIELD16( bBuddyStickyGroup );
  BITS_FIELD16( fillBits, 13 );
  uint64_t totalHitCount;
  lb_context_id_t contextId;
  buddy_sticky_id_t buddy_id;
    uint32_t numReverseStickyEntries;
#ifndef __LP64__
  uint32_t padding[2];
#endif
} lb_sticky_group_stats_t;
```

98

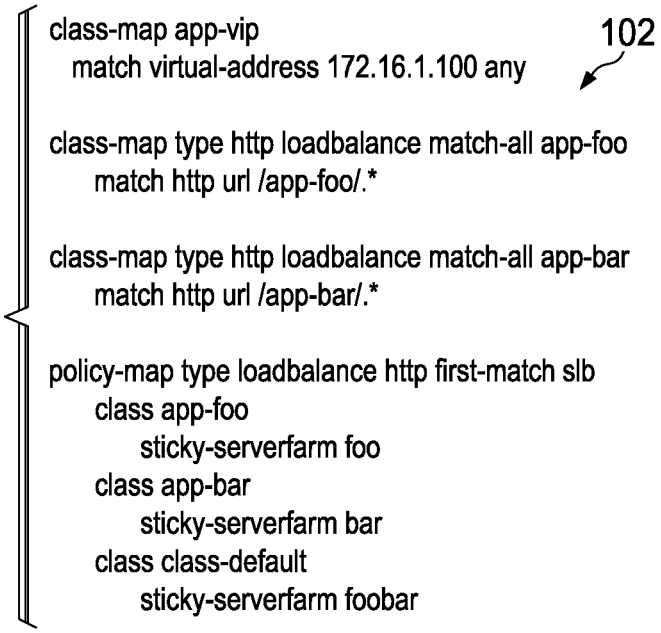

FIG. 11B

```
class-map app-vip                                    102
    match virtual-address 172.16.1.100 any class-map type http loadbalance match-all app-foo
    match http url /app-foo/.* class-map type http loadbalance match-all app-bar
    match http url /app-bar/.* policy-map type loadbalance http first-match slb
    class app-foo
        sticky-serverfarm foo
    class app-bar
        sticky-serverfarm bar
    class class-default
        sticky-serverfarm foobar
```

FIG. 13A

```
access-list acl line 1 extended permit ip any any rserver host RS1
    ip address 103.1.1.1
    inservice
rserver host RS2
    ip address 103.1.1.2
    inservide serverfarm host SF1
    rserver RS1
        buddy blue
        inservice
    rserver RS2
        buddy red
        inservice serverfarm host SF2
    rserver RS1 443
        buddy blue
        inservice
    rserver RS2 443
        buddy red
        inservice sticky ip-netmask 255.255.255.255 address source SG1
    serverfarm SF1
    timeout 100
    member alpha
sticky ip-netmask 255.255.255.255 address source SG2
    serverfarm SF2
    member alpha
```

```
class-map match-all cmap                                    106
   2 match virtual-address 93.1.1.100 tcp 80
class-map match-all cmap2
   2 match virtual-address 93.1.1.100 tcp 443 class-map type management match-any remote-access
   2 match protocol icmp any
   4 match protocol http any
   5 match protocol telnet any
   6 match protocol https any
   7 match protocol ssh any policy-map type management first-match remote_ma
   class remote-access
      permit policy-map type loadbalance first-match lb-pm
   class class-default
      sticky-serverfarm SG1 policy-map type loadbalance first-match lb-pm2
   class class-default
      sticky-serverfarm SG2 policy-map multi-match top-pm
   class cmap
      loadbalance vip inservice
      loadbalance policy lb-pm
      loadbalance vip icmp-reply
   class cmap2
      loadbalance vip inservice
      loadbalance policy lb-pm2
      loadbalance vip icmp-reply
```

FIG. 15

```
switch/Admin# sh rserver detail                              110
  rserver             : rs1, type: HOST
  state               : OPERATIONAL (verified by ARP response)
  description         : -
  max-conns           : -  , out-of-rotation count  : -
  min-conns           : -
  conn-rate-limit     : -  , out-of-rotation count  : -
  bandwidth-rate-limit: -  , out-of-rotation count  : -
  weight              : 8
  ----- connections -----
       real         weight    state        current    total
     ---+---+------------+------+------------
     serverfarm: sf1
     3.126.1.2:0       8     OPERATIONAL  0        2
     max-conns         : -  , out-of-rotation count  : -
     min-conns         : -
     conn-rate-limit   : -  , out-of-rotation count  : -
     bandwidth-rate-limit: -  , out-of-rotation count  : -
     total conn-failures : 0
     buddy group       : blue serverfarm: sf2
     3.126.1.2:0       8     OPERATIONAL  0        0
     max-conns         : -  , out-of-rotation count  : -
     min-conns         : -
     conn-rate-limit   : -  , out-of-rotation count  : -
     bandwidth-rate-limit: -  , out-of-rotation count  : -
     total conn-failures : 0
     buddy group       : green
```

FIG. 16

```
switch/Admin# sh serverfarm detail
  serverfarm     : sf1, type: HOST
  total rservers : 5
  active rservers : 5
  description    : -                              112
  state          : ACTIVE
  predictor      : ROUNDROBIN
  failaction     : -
  back-inservice     : 0
  partial-threshold  : 0
  num times failover         : 1
  num times back inservice   : 4
  total conn-dropcount  : 0
----- connections -----
    real                  weight  state      current
total        failures
  --+-----+--------+-------+-----+-----
rserver: rs1
3.126.1.2:0    8      OPERATIONAL  0    2    0
  max-conns      : - ,  out-of-rotation count : -
  min-conns      : -
  conn-rate-limit      : - ,  out-of-rotation count : -
  bandwidth-rate-limit: - ,  out-of-rotation count : -
  retcode out-of-rotation count : -
  buddy group                   : blue rserver: rs2
3.126.1.3:0    8      OPERATIONAL  0    0    0
  max-conns      : - ,  out-of-rotation count : -
  min-conns      : -
  conn-rate-limit      : - ,  out-of-rotation count : -
  bandwidth-rate-limit: - ,  out-of-rotation count : -
  retcode out-of-rotation count : -
  buddy group                   : green
```

FIG. 17

```
switch/Admin# sh stats sticky                114

+------------------------------+
+--------Sticky statistics----------+
+------------------------------+
 Total sticky entries reused        : 0
 prior to expiry
 Total active sticky entries        : 1
 Total active sticky conns          : 0
 Total static sticky entries        : 0
 Total active buddy stick entries   : 1
 Total active buddy conns           : 0
```

FIG. 18A

```
switch/Admin# sh buddy-group         116

Buddy-Group    Serverfarm    real
--------+-----------+--
Blue           sf1           rs1,rs2
               ------------------
               sf2           rs1
---------------------------------
Green          sf1           rs3
               ------------------
               sf2           rs3
```

FIG. 18B

```
switch/Admin# sh buddy-group Blue

Buddy-group : Blue
No of Serverfarms  : 2
No of Rservers     : 2

Serverfarm : sf1          118
Rserver : rs1,rs2

Serverfarm : sf2
Rserver : rs1
```

FIG. 18C

```
switch/Admin# sh buddy-group detail

No of buddy groups  : 2

Buddy-group : Blue
No of Serverfarms   : 2
No of Rservers      : 3
Total Buddy Entries     :2

Serverfarm      real
-------------------
sf1             rs1,rs2
-------------------
sf2             rs1

Buddy-group : Green
No of Serverfarms   : 2
No of Rservers      : 2
Total Buddy Entries     :2

Serverfarm      real
--------+----------
sf1             rs3
-------------------
sf2             rs3
```

120

US 9,392,066 B2

CONNECTION PERSISTENCE ACROSS SERVER FARMS IN A NETWORK ENVIRONMENT

TECHNICAL FIELD

This disclosure relates in general to the field of communications and, more particularly, to connection persistence across server farms in a network environment.

BACKGROUND

Data centers are increasingly used by enterprises for collaboration and for storing data and/or resources. A typical data center network contains myriad network elements, including hosts, loadbalancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8A is a simplified diagram illustrating example details of an embodiment of the communication system;

FIG. 8B is a simplified diagram illustrating other example details of an embodiment of the communication system;

FIG. 8C is a simplified diagram illustrating yet other example details of an embodiment of the communication system;

FIG. 8D is a simplified diagram illustrating yet other example details of an embodiment of the communication system;

FIG. 9A is a simplified diagram illustrating yet other example details of an embodiment of the communication system;

FIG. 9B is a simplified diagram illustrating other example details of an embodiment of the communication system;

FIG. 9C is a simplified diagram illustrating yet other example details of an embodiment of the communication system;

FIG. 9D is a simplified diagram illustrating yet other example details of an embodiment of the communication system;

FIG. 9E is a simplified diagram illustrating yet other example details of an embodiment of the communication system;

FIG. 11B is a simplified diagram illustrating yet other example details of an embodiment of the communication system;

FIG. 13A is a simplified diagram illustrating yet other example details of an embodiment of the communication system;

FIG. 13B is a simplified diagram illustrating yet other example details of an embodiment of the communication system;

FIG. 15 is a simplified diagram illustrating yet other example details of an embodiment of the communication system;

FIG. 16 is a simplified diagram illustrating yet other example details of an embodiment of the communication system;

FIG. 17 is a simplified diagram illustrating yet other example details of an embodiment of the communication system;

FIG. 18A is a simplified diagram illustrating yet other example details of an embodiment of the communication system;

FIG. 18B is a simplified diagram illustrating yet other example details of an embodiment of the communication system;

FIG. 18C is a simplified diagram illustrating yet other example details of an embodiment of the communication system;

DETAILED DESCRIPTION OF EXAMPLE EMBODIMENTS

Overview

An example method for connection persistence across server farms in a network environment is provided and includes associating a first real server with a first server farm attached to a first virtual Internet Protocol address (VIP), associating a second real server with a second server farm attached to a second VIP, and linking the first real server with the second real server in a particular group (e.g., a buddy group comprising one or more real servers from one or more server farms). The first real server is configured to service a first connection from a client to the first VIP in a network environment, the second real server is configured to service a second connection from the client to the second VIP in the network environment, and the method further includes facilitating connection persistence of the first connection with the second connection across the first server farm and the second server farm.

Example Embodiments

Figure 1:
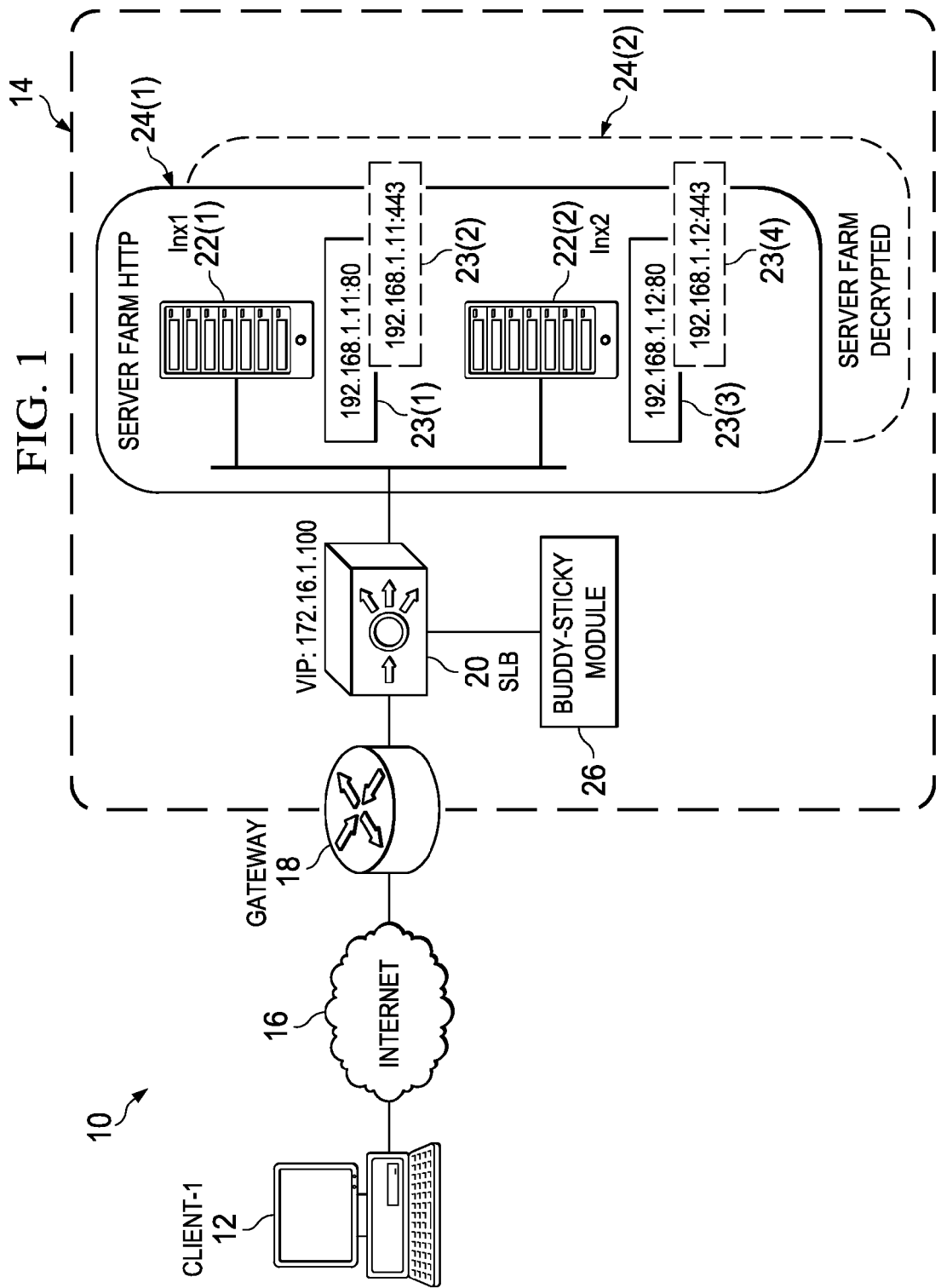
FIG. 1 is a simplified block diagram illustrating a communication system to facilitate connection persistence across server farms in a network environment according to an example embodiment.

Turning to FIG. 1, FIG. 1 is a simplified block diagram illustrating an embodiment of communication system 10 for facilitating connection persistence across server farms in a network environment. Communication system 10 includes a client 12 communicating with a network 14 across another network 16 (e.g., Internet) through a gateway 18. A server loadbalancer (SLB) 20 may intercept the communication from client 12 and perform loadbalancing algorithms (or other suitable network optimizations) before routing the communication to one of a plurality of servers (e.g., servers 22(1) and 22(2)).

Each server (e.g., 22(1), 22(2)) may include one or more "real servers" (e.g., 23(1)-23(4)) that belong to one or more server farms (e.g., 24(1), 24(2)) attached to separate and distinct virtual Internet Protocol addresses (VIPs). The term "real server" can comprise (or be associated with) an instantiation of the server at a specific IP address and/or port of the server (e.g., 192.168.1.11:80). In some embodiments, each real server may be instantiated at separate and distinct ports on the same physical (or virtual) server. For example, each real server (e.g., 23(1)-23(4)) may be associated with (or comprise) the respective servers (e.g., 22(1)-22(2)) listening on distinct ports (e.g., 80 and 443).

The term "server farm" includes a logical group of real servers on network 14 that can be uniquely identified by an identifier, such as a server farm name (e.g., server farm 24(1) identified by name "http;" server farm 24(2) identified by name "decrypted"). Each server farm may be configured separately at SLB 20 to include the list of real servers that may be associated with the respective server farm. The term "client" includes a software program (or the device on which the program executes) that requests a specific service from a server (or real server).

The VIP is an IP address that is shared among multiple real servers. For example, substantially all real servers in server farm 24(1) may share the VIP associated with server farm 24(1). In an example embodiment, server 22(1) may include real server 23(1) at an Internet Protocol (IP) address of 192.168.1.11:80 that belongs to server farm 24(1) attached to VIP 172.16.1.100:80; server 22(1) include real server 23(2) at an IP address of 192.168.1.11:443 that belongs to server farm 24(2) attached to VIP 172.16.1.100:443. Likewise, server 22(2) may include real server 23(3) at IP address 192.168.1.12:80 that belongs to server farm 24(1) attached to VIP 172.16.1.100:80; server 22(2) may include real server 23(4) at 192.168.1.12:443 that belongs at server farm 24(2) attached to VIP 172.16.1.100:443.

As used herein, the term "server" encompasses any software program (or the device on which the program executes) that provides any service (e.g., web based application, hypertext transfer protocol (HTTP) content, Extensible markup language (XML) content, streaming media (video or audio), trivial file transfer protocol (TFTP) uploads and downloads, file transfer protocol (FTP) uploads and downloads, etc.) to a client (e.g., 12). In some embodiments, the servers are dedicated physical devices (e.g., computers such as rack servers, blade servers, etc.). In other embodiments, the servers are virtually executing on non-dedicated devices (e.g., that can perform non-server related functions). Servers can be identified with names and characterized with Internet Protocol (IP) addresses, connection limits, and weight values (among other parameters).

A buddy sticky module 26 associated with SLB 20 may ensure connection persistence across multiple server farms (e.g., 24(1)-24(2)) so that separate connections from the same client (e.g., 12) can be handled by the same server (e.g., 22(1)) or by buddied real server instances (e.g., two or more servers share flow tables for processing a connection from client 12, or buddy sticky module 26 can enable the servers to share flow tables).

The term "connection" includes a communication pathway between two or more communicating devices (e.g., client 12 and server 22(1)). A specific connection can support more than one session, which includes an exchange of messages between the two communicating devices. The session may be stateful where at least one of the communicating devices saves information about the session history. As used herein, "connection persistence" refers to any ability of a loadbalancer (e.g., SLB 20) or other traffic management network element to maintain a virtual connection between a client (e.g., 12) and a specific server (e.g., 22(1)) or to a group of servers. Connection persistence can also be referred to as "stickiness" or "server affinity." Connection persistence ensures that once the client (e.g., 12) has made a connection to the specific server (e.g., 22(1)), subsequent requests from the same client are sent to the same server.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical SLB manages traffic flow to real servers in a network through suitable loadbalancing algorithms. For example, assume that real servers HTTP-1 at 10.102.29.5:80 and HTTP-2 at 10.102.29.6:80 are created and bound to the SLB at VIP 10.102.29.60:80. HTTP-1 and HTTP-2 may include real servers on a single server, or different servers. SLB forwards any client request to the VIP to either HTTP-1 or HTTP-2. Thus, different transmissions from the same client may be directed to different real servers even though the transmissions are part of the same session. Persistence or stickiness may be configured on the SLB to ensure that connections from the same client to the same application are not disrupted by the loadbalancing algorithms.

In some networking scenarios, for example, a shopping cart web application, where a user orders goods using a web browser, most of the session may be handled over HTTP. During checkout, the user may share sensitive financial information, which should likely be handled over a secure protocol, such as HTTPS. However, the HTTPS session may start a new connection, and without connection persistence, information about the previous HTTP session (which includes data about the goods ordered) may be lost. With connection persistence across a single server farm, the SLB can route connections from the same user to the shopping cart application, Web-based email, or other network application executing on the same server in the server farm. The advantage of connection persistence is that connection state from the HTTP session is saved in the hardware (e.g., memory element) of the server, and therefore, can be re-used for the HTTPS connection. In some scenarios, multiple servers may share a specific connection, and maintain a shared knowledge of the connection state using various methods. Connection persistence in such scenarios may be implemented by sending the requests from the client to the same group of servers sharing the connection within the same server farm.

Connection persistence can be also beneficial when application traffic is directed to the same server and port address translation (PAT) is performed on the application traffic; or when a tiered application is aligned across multiple physical servers (e.g., where a connection hitting server1 in teir1, should also hit server1 in tier2, and server1 in tier3). Connection persistence can be configured based on various parameters in a packet. For example, connections from the same client IP address can be configured as belonging to the same session; connections that have the same HTTP cookie header can be configured as belonging to the same session; connections that have the same SSL session ID can be configured as belonging to the same session; connections to the same uniform resource locator (URL) can be configured as belonging to the same session; connections to the same destination IP address can be configured as belonging to the same session; connections from the same source IP address to the same destination IP address can be configured as belonging to the same session; etc.

Generally, connection persistence may be accomplished by linking real servers in a server farm through a sticky group. Typically, the sticky group comprises a Netmask and address. The address can be source, destination, or both. The Netmask specifies how many connections can be bound to the same real server or server farm, etc., after a first match. For example, sticky group A may be configured for a default Netmask 255.255.255.0, with address type both. An incoming packet with destination IP address of 192.168.0.11 and source IP address of 200.0.0.2 may be bound to real server 1 by the loadbalancer. Assume that a subsequent connection from IP address 200.0.0.30 comes in. The connection will be bound automatically to the real server 1 too, for connection persistence. With connection persistence, connections with source IP address from 200.0.0.0 to 200.0.0.255 will be bound to the real server 1, until the record times out. The sticky timeout specifies a period of time that the SLB keeps the IP address sticky information in the sticky database after the latest client connection terminates. When connection from 200.0.1.5 comes in, it may be loadbalanced to a different real server in the same server farm, say real server 2.

In situations where separate and distinct server farms handle HTTP requests and HTTPS requests (for example, for security purposes), connection persistence across multiple server farms may be needed. For example, real servers handling HTTP requests may be separated from real servers handling HTTPS requests through configuring the real servers in separate and distinct server farms. The HTTP request may also be differentiated from the HTTPS request based on the port handling the request. When the client request for the HTTPS connection is encountered on a port distinct from the port used for the HTTP connection, under currently existing mechanisms, the SLB chooses the server farm associated with the HTTPS port, and directs the HTTPS request to one of the real servers servicing that port. Because the real server is not associated with the server farm servicing the HTTP port, the HTTPS request may not reach the same server that serviced the HTTP connection, and therefore, connection persistence may not be achieved.

One possible mechanism to provide connection persistence across multiple server farms is to have L3 level VIP instead of L4 level VIP. With L3 level VIP, port numbers may not factor into loadbalancing algorithms; therefore, traffic entering the SLB on port 80 or 443 may hit the same server farm and get loadbalanced to the same server. However, in some scenarios, port address translation (PAT) may be desired for an SSL connection, HTTP connection, or both. PAT may be configured within a specific server farm on the SLB, and each server farm may be associated with a separate VIP. If the real servers are not defined within a port, or associated therewith, as in an L3 server farm, PAT may not be feasible.

Moreover, for security reasons (or for other reasons), different VIPs may be used to service different kinds of requests. For example, the VIPs may be based on port numbers: VIP-1 may only service requests coming on port 80 and VIP-2 may only service requests coming on port 44. Having a L3-level VIP without port numbers can allow traffic on every port for that VIP, which can compromise security. Additional requirements may include performing network address translation (NAT) on requests on VIP-1 and VIP-2, separately. If the same server farm (represented by a pool of real servers) is attached to both VIP-1 and VIP-2, the connections on VIP-1 and VIP-2 may be translated to the same pool of real servers, which may not satisfy the security requirements, although it would provide connection persistence. Alternatively, if different real servers are attached to VIP-1 and VIP-2, network address translation security requirements may be met, without providing connection persistence.

Communication system 10 is configured to address these issues (and others) in offering a system and method for connection persistence across server farms in a network environment. Embodiments of communication system 10 can associate a first real server (e.g., 23(1)) with a first server farm (e.g., 24(1)) attached to a first VIP (e.g., 172.16.1.100:80); associate a second real server (e.g., 23(2)) with a second server farm (e.g., 24(2)) attached to a second VIP (e.g., 172.16.1.100:443); and link the first real server (e.g., 23(1)) with the second real server (e.g., 23(2)) to form a buddy group. The buddy group may be identified by a name, or other suitable identifier (ID). The first real server (e.g., 23(1)) is configured to service a first connection to the first VIP, and the second real server (e.g., 23(2)) is configured to service a second connection to the second VIP.

Embodiments of communication system 10 can facilitate persistence of the first connection with the second connection to the same server (e.g., 22(1)) across the first server farm (e.g., 24(1)) and the second server farm (e.g., 24(1)). In an example embodiment, the first connection from client 12 may be directed to the first real server (e.g., 23(1)), and the buddy group may be associated with client 12 in a sticky database. For example, a hash C1 may be computed based on the source IP address of client 12, and the hash may be tied to the buddy-group identifier (e.g., C1/alpha) in the sticky database. Any suitable mechanism may be used to associate the buddy-group with client 12. When the second connection from client 12 is received, the buddy group associated with client 12 may be identified, for example, by looking up the sticky database. In an example, the hash C1 may be computed based on the source IP address, and a lookup of the sticky database for the hash may be performed. The entry C1/alpha may be returned, and the buddy-group ID alpha associated therewith may be ascertained. The second real server (e.g., 23(2)) belonging to the buddy group and the second server farm (e.g., 24(2)) may then be identified, and the second connection may be directed to the second real server (e.g., 23(2)) to facilitate connection persistence.

In various embodiments, the buddy group may comprise a buddy-real group and a buddy-sticky group. Linking the first real server (e.g., 23(1)) with the second real server (e.g., 23(2)) in the buddy group can comprise creating a buddy-real group when specifying real servers in a particular server farm. For example, real server 23(1) can be made a member of a buddy-real group (having a name group_name) by using a suitable command (e.g., buddy group_name) in a server farm host real server configuration mode of SLB 20. Linking the first real server (e.g., 23(1)) with the second real server (e.g., 23(2)) in a buddy group can further comprise creating a buddy-sticky group when specifying server farms in a particular sticky group. For example, server farm 24(1) can be made a member of a buddy-sticky group (having a name group_name) by using a suitable command (e.g., member group_name) in a sticky configuration mode of SLB 20. The buddy-real group and the buddy-sticky group can together cause packets from the same client (e.g., 12) on different connections to be directed to the same server (e.g., 22(1)), facilitating connection persistence.

In some embodiments, buddy sticky module 26 may facilitate a one-to-one association, linking client 12 to the same server (e.g., 22(1)) associated with two different server farms (e.g., 24(1) and 24(2)). Merely by way of example, and not as limitations, assume that server farms 24(1)-24(2) correspond to separate classes of L7 traffic (e.g., traffic in protocols such as HTTP, FTP, etc., identifiable at Layer 7 of the OSI model). For example, server farm 24(1) (e.g., serverfarm http) may be associated with HTTP traffic; and server farm 24(2) (e.g., serverfarm decrypted) may be associated with HTTPS traffic. Separate real servers 23(1)-23(4) on respective servers 22(1) and 22(2) may be configured and associated with server farms 24(1)-24(2). Thus, real server 23(1) and 23(2) on respective servers 22(1) and 22(2) may service HTTP traffic; and real servers 23(2) and 23(4) on respective servers 22(1) and 22(2) may service HTTPS traffic.

SLB 20 may be configured to loadbalance HTTP requests to server farm 24(1) using either real server 23(1) on server 22(1) or real server 23(3) on server 22(2). SLB 20 may be also configured to loadbalance HTTPS requests to server farm 24(2) using either real server 23(2) on server 22(1) or real server 23(4) on server 22(2). Buddy sticky module 26 may link real server 23(1) associated with server farm 24(1) with real server 23(2) associated with server farm 24(2), so that separate connections from same client 12 may be processed by the same server 22(1).

Merely for example purposes, assume that client 12 sends an HTTP request to VIP 172.16.1.100, destination port 80 to begin to build a shopping cart. SLB 20 loadbalances the request to server farm 24(1), real server 23(1) on server 22(1), and creates a sticky entry based on the corresponding sticky group (for example, source IP address) that sticks client 12 to real server 23(1) while client 12 builds the shopping cart. When client 12 moves to a secured connection (e.g., port 443) for checkout, the connection is directed to the VIP with destination port 443 and SLB 20 sends client 12 to server farm 24(2). SLB 20 finds an existing sticky entry with real server 23(1) and directs client 12 to real server 23(2) in server farm 24(2) because the two real servers are linked together under a common buddy group.

According to embodiments of communication system 10, different buddy groups may link together real servers associated with different server farms attached to different VIPs. Consequently, PAT may be implemented so that requests to a particular server farm at a particular port may be translated to another port if the application on the servers is listening on the other port. For example, assume that a cart-checkout application is listening on port 100 of the same server where a catalogue application is listening on port 80. According to embodiments of communication system 10, requests on port 443 may be translated to port 100, but requests on port 80 may be left as is, without translation. Moreover, persistence at VIP level as well as L7-policy level may be implemented, to provide more flexibility.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of real servers, servers, server farms, and SLBs (and other network elements) within the broad scope of the embodiments.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

SLB 20 may be any suitable loadbalancer or other network optimization appliance that directs traffic to one or more real servers within a server farm as part of its operations. In some embodiments, SLB 20 may direct traffic to a particular server farm based on a port at which the traffic arrives; in other embodiments, SLB 20 may direct traffic to a particular server farm based on a class of traffic; in yet other embodiments, SLB 20 may direct traffic to a particular server farm based on parameters in packet headers; in yet other embodiments, SLB 20 may direct traffic to a particular server farm based on parameters in the packet payload. Various loadbalancing and other optimization algorithms may be executed on SLB 20 to direct traffic to a particular server farm within the broad scope of the embodiments.

In some embodiments, buddy sticky module 26 can include an application executing on SLB 20. In other embodiments, buddy sticky module 26 can include an application executing on another network element in communication with SLB 20. Network elements can include computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In some embodiments, buddy sticky module 26 may be implemented in a separate stand-alone box that can be plugged into, or otherwise connected to, SLB 20. In some embodiments, buddy sticky module 26 may be implemented in hardware, in software, or in a combination of hardware and software.

Figure 2:
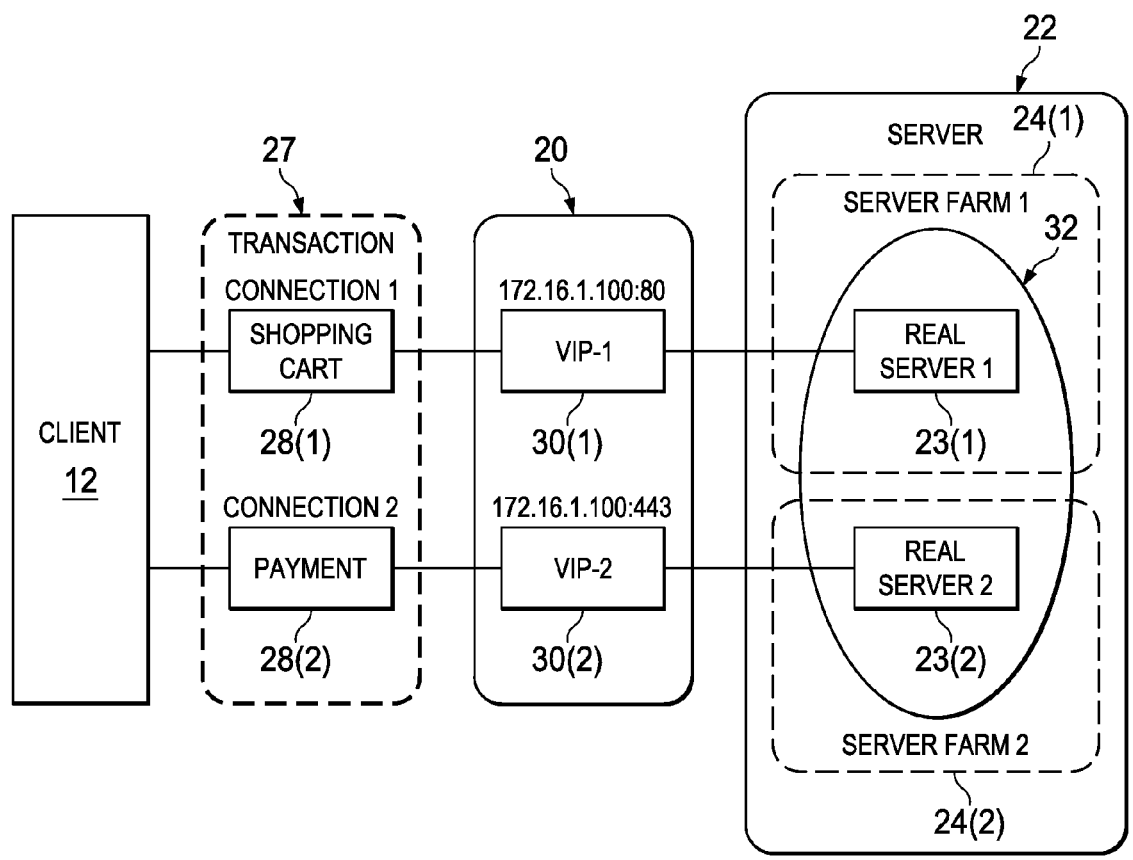
FIG. 2 is a simplified block diagram illustrating example details of the communication system in accordance with one embodiment.

Turning to FIG. 2, FIG. 2 is a simplified block diagram illustrating example details of an embodiment of communication system 10. Client 12 may engage in a transaction 27 with an application executing in server 22. Transaction 27 may correspond to a business process (e.g., sales order) by a client (e.g., 12) that is executed through an application in discrete steps (e.g., verify product availability, obtain payment, commit order). Depending on the protocol and other network parameters, transaction 27 may include one or more connections 28(1)-28(2) from the same client 12. For example, consider a user shopping on client 12 with a Web-based application executing on server 22. Transaction 27 engaged in by the user can include, by way of example, and not limitation, a shopping cart (e.g., where the user selects goods to order) comprising connection 28(1) (e.g., connection 1), and a payment (e.g., where the user pays using a credit card or other forms of payment) comprising connection 28(2) (e.g., connection 2).

In various embodiments, connection 28(1) (e.g., HTTP requests and responses) may be directed to VIP 30(1) (e.g., VIP-1 172.16.1.100:80) configured on SLB 20. VIP-1 may be associated with server farm 24(1) on SLB 20. SLB 20 may forward connection 28(1) to server 22 to be serviced by real server 23(1) (e.g., service instance 1). For security or other purposes, connection 28(2) (e.g., HTTPS requests and responses) may be directed to VIP 30(2) (e.g., VIP-2 172.16.1.100:443) configured on SLB 20 and associated with server farm 24(2). Buddy sticky module 26 may link real server 23(1) and 23(2) in a buddy group 32 so that SLB 20 can discover real server 23(2) during a lookup of a sticky database for the appropriate real server to forward connection 28(2). SLB 20 may forward connection 28(2) to real server 23(2) on server 22. Consequently, both connections 28(1) and 28(2) may be processed by the same server 22, facilitating connection persistence across server farms 24(1) and 24(2) for transaction 27.

Figure 3:
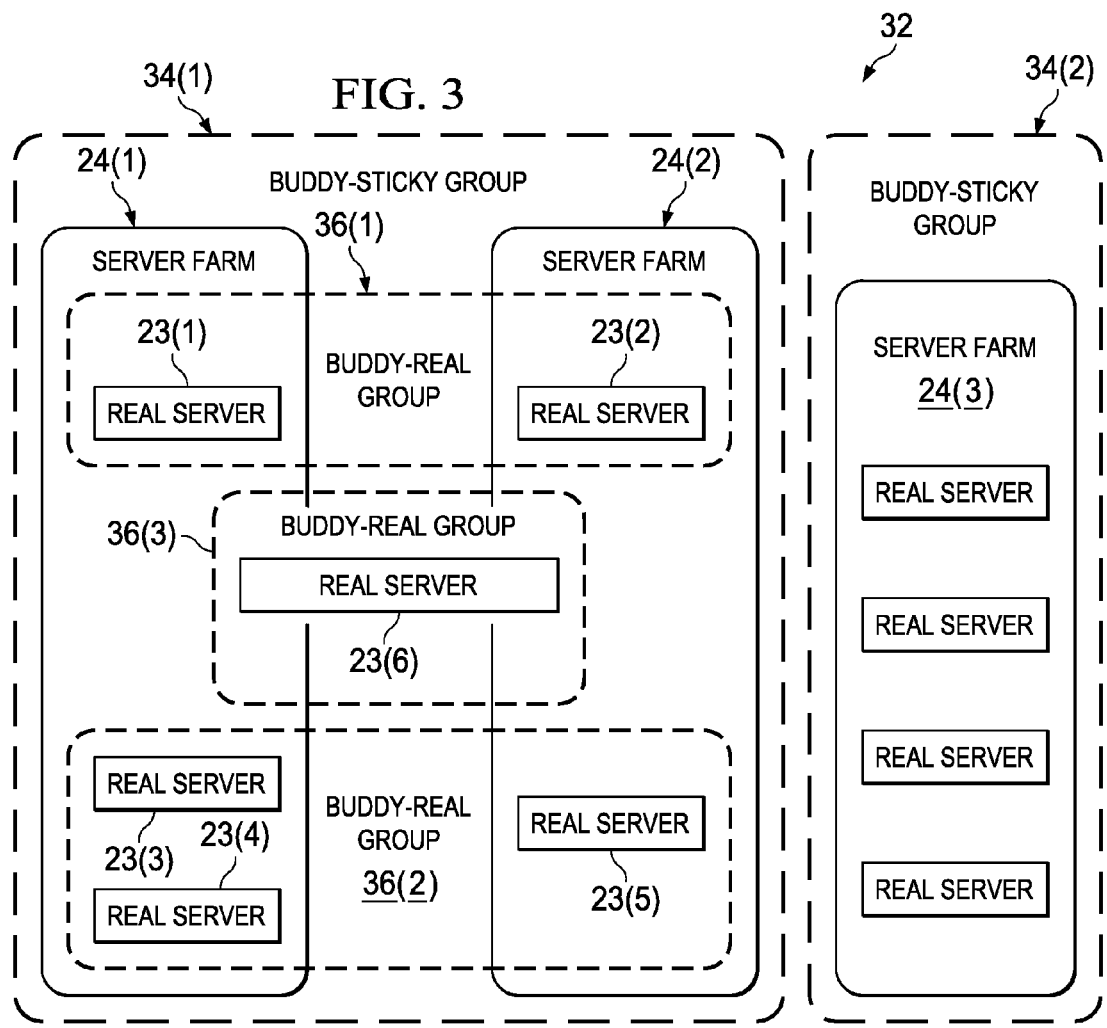
FIG. 3 is a simplified block diagram illustrating other example details of the communication system in accordance with one embodiment.

Turning to FIG. 3, FIG. 3 is a simplified block diagram illustrating example details associated with buddy-sticky groups and buddy-real groups according to an embodiment of communication system 10. According to the example illustrated, buddy group 32 may comprise buddy-sticky groups 34(1) and 34(2). Buddy-sticky group 34(1) may include server farms 24(1) and 24(2). Each server farm 24(1) and 24(2) may be associated with separate sticky groups, which, unlike buddy-sticky groups, do not straddle distinct server farms. Buddy-sticky group 34(2) may include server farm 24(3) and possibly other server farms (not illustrated). Buddy group 32 may also comprise buddy-real groups 36(1)-36(3). For example, buddy-real group 36(1) may comprise real servers 23(1) and 23(2) in server farms 24(1) and 24(2), respectively. Buddy-real group 36(2) may comprise real servers 23(3)-23(6) in server farms 24(1) and 24(2). Buddy-real group 36(3) may comprise real server 23(6) that is configured in both server farms 24(1) and 24(2). Note that only a few real servers, server farms, buddy-sticky groups, and buddy-real groups are illustrated herein for simplicity. Virtually any number of real servers, server farms, buddy-sticky groups, and buddy-real groups may be configured within the broad scope of the embodiments. Moreover, any suitable combination of real servers across server farms may be included in buddy group 32.

Figure 4:
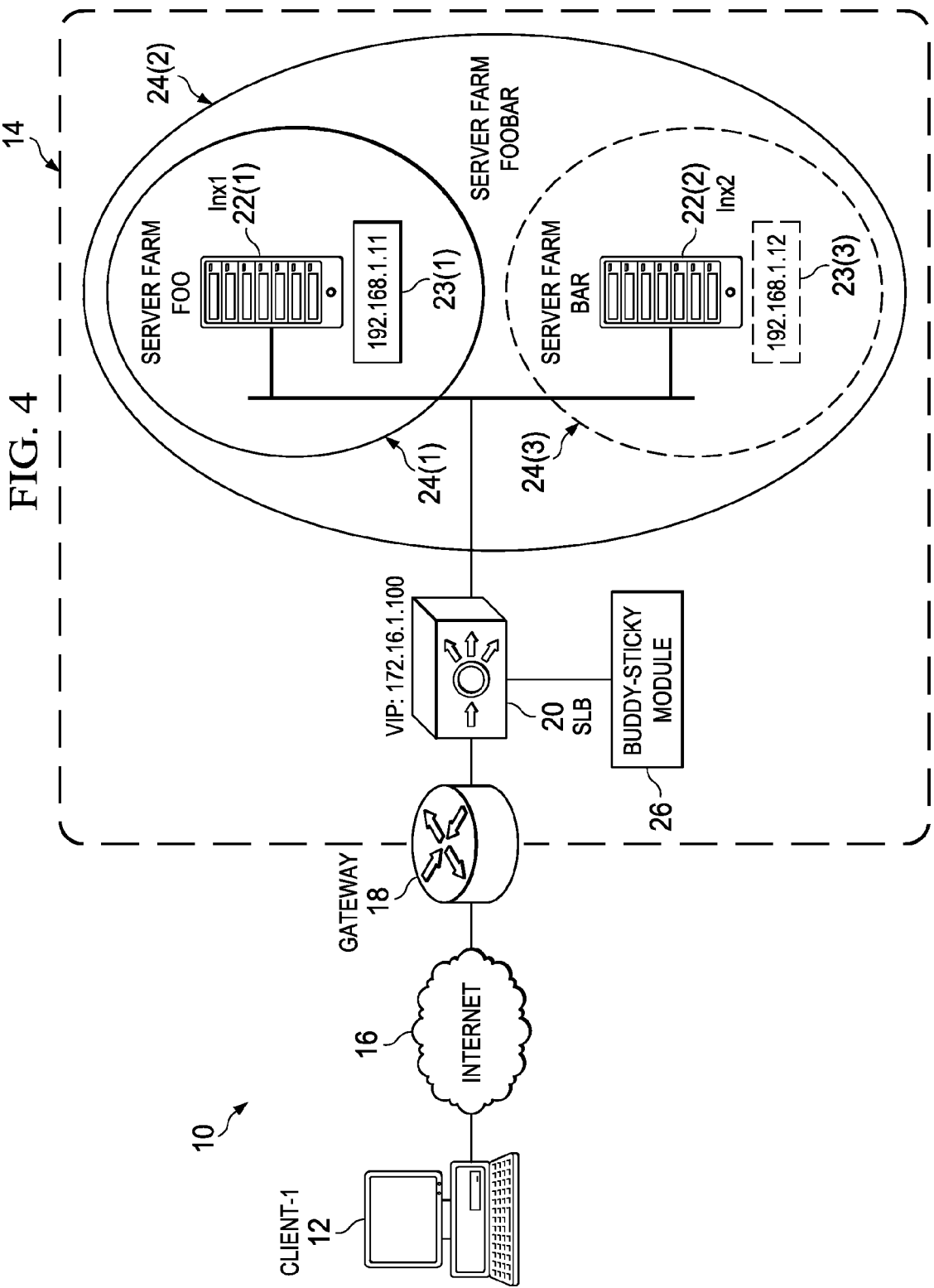
FIG. 4 is a simplified block diagram illustrating the communication system in accordance with another example embodiment.

Turning to FIG. 4, FIG. 4 is a simplified block diagram illustrating example details of an embodiment of communication system 10. In some embodiments, buddy sticky module 26 may facilitate an asymmetric association, sticking (e.g., associating, linking, connecting, joining, relating, etc.) client 12 to the same real server (e.g., 23(1)) in two different server farms (e.g., 24(1) and 24(2)) when client 12 comes back with two different traffic types (e.g., HTTP and non-HTTP). Merely by way of example, and not as limitations, assume that SLB 20 is configured with three server farms 24(1)-24(3), corresponding to separate classes of L7 traffic (e.g., traffic in protocols such as HTTP, FTP, etc., identifiable at Layer 7 of the OSI model). For example, server farm 24(1) (e.g., foo) may be associated with HTTP traffic; server farm 24(2) (e.g., foobar) may be associated with HTTPS traffic; and server farm 24(3) (e.g., bar) may be associated with FTP traffic. Separate real servers 23(1) and 23(2) on respective servers 22(1) and 22(2) may be configured and associated with server farms 24(1)-24(3). Thus, real server 23(1) may service HTTP and HTTPS traffic; and real server 23(2) may service FTP and HTTPS traffic. Buddy sticky module 26 may link real server 23(1) associated with server farm 24(1) with the same real server 23(1) associated with another server farm 24(2), so that traffic from client 12 may be processed by the same server 22(1).

Figure 5:
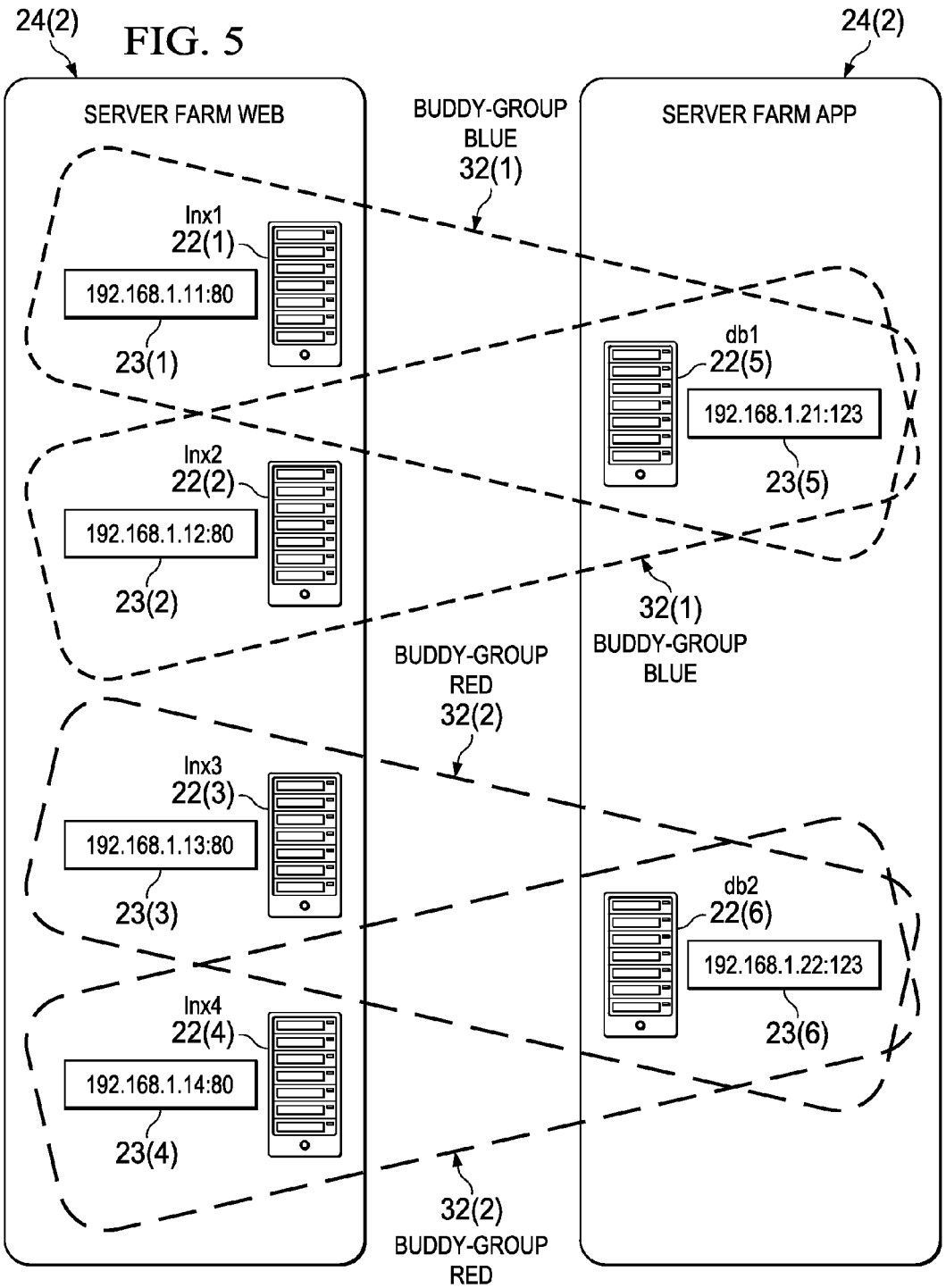
FIG. 5 is a simplified block diagram illustrating example details of the communication system in accordance with yet another example embodiment.

Turning to FIG. 5, FIG. 5 is a simplified block diagram illustrating example details that may be associated with embodiments of communication system 10. In some embodiments, buddy sticky module 26 may facilitate a many-to-one association, sticking multiple, first tier real servers in one server farm to one real server in a second tier in another server farm that contains fewer servers. Such scenarios may be encountered, for example, when clients are loadbalanced to a first-tier server farm containing many real servers and are then directed to a second-tier server farm that contains fewer real servers.

Merely by way of example, and not as limitations, assume that SLB 20 is configured with two server farms 24(1)-24(2) (e.g., serverfarm web and serverfarm app), corresponding to separate types of traffic (e.g., web traffic, application traffic, etc.). For example, server farm 24(1) may be associated with web traffic; and server farm 24(2) may be associated with application traffic. Separate real servers 23(1)-23(4) on respective servers 22(1)-22(4) may be configured and associated with server farm 24(1); likewise, separate real servers 23(5)-23(6) on respective servers 22(5)-22(6) may be configured and associated with server farm 24(2). Thus, real servers 23(1)-23(4) may service web traffic; and real servers 23(5)-23(6) may service application traffic. Buddy sticky module 26 may link real servers 23(1), 23(2) and 23(5) across server farms 24(1) and 24(2) in buddy group 32(1) (e.g., buddy group blue); similarly, buddy sticky module 26 may link real servers 23(4), 23(5) and 23(6) across server farms 24(1) and 24(2) in buddy group 32(2) (e.g., buddy group red).

When web traffic from client 12 is forwarded to server farm 24(1), any one of real servers 23(1)-23(4) in server farm 24(1) may be selected to service the traffic from client 12. After a specific real server (e.g., 23(1)) is selected, subsequent traffic from client 12 destined to the same server farm may be forwarded to other members of the same buddy group. For example, if real server 23(1) at 192.168.1.11:80 is initially selected for servicing web traffic from client 12, subsequent web traffic from client 12 may be forwarded to either real server 23(1) or real server 23(2) in buddy group 32(1). Subsequent application traffic from client 12 may be forwarded, according to embodiments of communication system 10, to real server 23(5) in server farm 24(2) that belongs to buddy group 32(1). Thus, when SLB 20 loadbalances client 12 to either server 22(1) or 22(2) in server farm 24(1), client 12 is directed to server 22(5) when ready to move to server farm 24(2). Real servers connected in buddy-groups may be configured to share session state information suitably. Likewise, when SLB 20 loadbalances client 12 to either server 22(3) or 22(4) in server farm 24(1), client 12 is directed to server 22(6) when ready to move to server farm 24(2).

Figure 6:
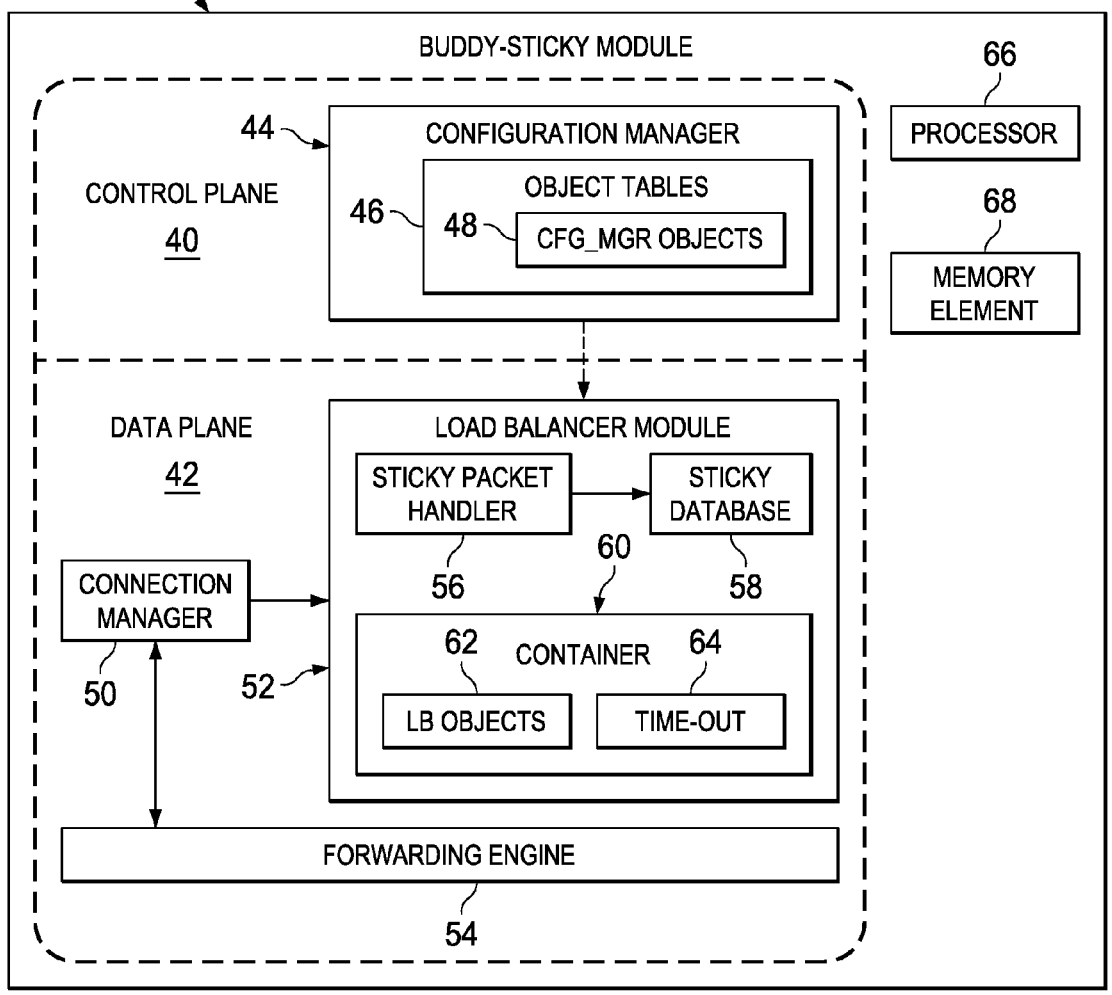
FIG. 6 is a simplified block diagram illustrating example details of the communication system in accordance with an example embodiment.

Turning to FIG. 6, FIG. 6 is a simplified block diagram illustrating example details that may be associated with embodiments of communication system 10. Typically, the virtualized network environment in SLBs (e.g., SLB 20) can be divided into objects called contexts. Each context behaves like an independent SLB with its own policies, interfaces, domains, server farms, real servers, and administrators. As used herein, an "object" is any location in a memory element that has a value and that can be referenced by an identifier. The object can be a variable, function, data structure, file, or a particular instance of a class, along with associated processing routines that have a set of attributes (e.g., object elements, data components, properties, etc.) and behaviors (e.g., methods, subroutines, algorithms, etc.). For example, a text file is the class, and a specific text file (e.g., A.txt) is the object. The class defines properties and behavior for multiple instantiations (e.g., objects). The object is typically characterized by three properties: (1) identity (serving to distinguish one object from another); (2) states (describing the data stored in the object); and (3) behavior (describing the methods by which the object can be used). The object may be stored in the form of a data structure (e.g., a particular way of storing and organizing data in a computer).

Buddy sticky module 26 may include a control plane (CP) 40 and a data plane (DP) 42. CP 40 may be provisioned with a configuration manager (Cfg_Mgr) 44, which can include one or more object tables 46 including Cfg_Mgr objects 48. DP 42 can include a connection manager 50, a loadbalancer (LB) module 52, and a forwarding engine 54. LB module 52 can include a sticky packet handler 56 and an associated sticky database 58. According to some embodiments, sticky database 58 may be associated with SLB 20, and used for various loadbalancing algorithms, in addition to operations of buddy sticky module 26. A container 60 (e.g., a class, a data structure or an abstract data type whose instances are collections of other objects; in other words, containers are used for storing objects in an organized way following specific access rules) may include LB objects 62 and time-outs 64, which may be associated with one or more contexts. A processor 66 and a memory element 68 may facilitate operations of buddy sticky module 26.

Embodiments of communication system 10 can link real servers through buddy groups. In some embodiments, existing sticky groups, comprising portions of a single server farm, may be modified to be linked across server farms in buddy-sticky groups. Buddy-real groups comprising real servers may be generated and linked to the buddy-sticky groups. In various embodiments, object tables 46 may include a first object table for maintaining buddy-sticky objects (e.g., associated with buddy-sticky groups) and a second object table for maintaining buddy-real objects (e.g., associated with buddy-real groups).

An object (e.g., cm_sticky_group_t) may be included in Cfg_Mgr objects 48 to hold a buddy-sticky group ID and a Boolean indicating a configured buddy-sticky group (if any). Another object (e.g., cm_buddy_sticky_group_t) may be included in Cfg_Mgr objects 48 to hold the buddy-sticky group ID, a list of buddy-sticky groups configured with the buddy-sticky group ID and a buddy-sticky group name (e.g., to facilitate sticky group lookup functionality). The second object can also include timeout, IP-Netmask/v6-prefix if the buddy-sticky group is of type IP, and other parameters, based on suitable needs.

Yet another object (e.g., cm_sfarm_real_t) may be included in Cfg_Mgr objects 48 to hold a buddy-real group ID and a Boolean indicating a buddy-real group (if configured). Yet another object (e.g., cm_buddy_sfarm_real_t) may be included in Cfg_Mgr objects 48 to include the buddy-real group ID, a list of real servers configured with the buddy-real group ID and a buddy-real group name. Appropriate application programming interfaces (APIs) may be provided to download the buddy-sticky groups and buddy-real groups to DP 42. Suitable APIs may be provided to check if the configured buddy-sticky group or buddy-real group has already been declared, or otherwise exists in sticky database 58. The APIs may include suitable commands to facilitate the operations described herein.

In various embodiments, sticky database 58 may include an extended entry (called LbSticky_StickyEntry_t) that can hold a Boolean to differentiate between regular sticky entries (e.g., without any linking into buddy groups) and buddy sticky entries (e.g., associated with buddy groups). LB objects 56 may include buddy-sticky objects (buddy_sticky_type_t) and buddy-real objects (e.g., buddy_sticky_real_server_type_t) to hold sticky groups and real servers together. In various embodiments, the buddy-sticky objects and buddy-real objects may be linked together in a chain. When Cfg_Mgr 44 creates a new buddy-sticky group ID, LB module 52 may pull out a buddy_sticky_type_t structure from a global pool and add it to the chain. When Cfg_Mgr 44 creates a new buddy-real group ID, LB module 52 may pull out a buddy_real_server_t structure from the global pool and add it to the chain.

LB objects 56 may include an object (lb_sticky_group_info_t) and another object (e.g., lb_sticky_group_stats_t) to hold the buddy Boolean and buddy-sticky group ID. LB objects 56 may also include a real server structure lb_buddy_real_server_info_t, which can hold a real server ID and a server farm ID chained together under the buddy-real object. In some embodiments, a command line interface (CLI) may be provided (e.g., with suitable commands) to facilitate configuring the buddy lists under a real server level and a sticky group level. The infrastructure of communication system 10 may be configured to download buddy group configurations from Cfg_Mgr 44 to LB module 52.

When a buddy group (e.g., buddy group 32) is configured, a download thread in CP 40 may download the buddy Boolean and the buddy-real group name or ID into an object lb_real_server_info_t in DP 42. Substantially simultaneously, CP 40 may invoke another download thread with the buddy-real group ID, server farm ID and real server ID to populate the lb_buddy_real_server_info_t structure with the real server ID, server farm ID, and buddy-real group ID under a single buddy-real token. Cfg_Mgr 44 may also configure one or more server farms in a buddy-sticky group and invoke the download thread to download the buddy Boolean and the buddy-sticky group name or ID into a corresponding object in DP 42.

In some embodiments, when two sticky groups (represented by portions of two server farms) are linked together into a buddy-sticky group, they may have the same Netmask (for IP sticky) that can generate the same hash for the buddy-sticky group. In some embodiments, the two sticky groups may have different Netmasks. In such cases, the most granular Netmask may be selected for the buddy-sticky group. For example, consider a sticky group SG1 having stickiness associated with a source IP-Netmask of 255.255.255.255, that includes a server farm SF1, and is a member of buddy-sticky group alpha. Another sticky group SG2 having stickiness associated with a source IP-Netmask of 255.255.255.0 may include another server farm SF2, and also be a member of buddy-sticky group alpha. In such a scenario, 255.255.255.255 may be selected as the Netmask for stickiness decisions pertaining to the buddy-sticky group. Moreover, according to an embodiment of communication system 10, a shortest timeout may be selected as a final timeout for the buddy-sticky group, in case of different timeouts for the sticky groups linked together into a single buddy-sticky group. In some embodiments, sticky groups having different configurations (e.g., stickiness criteria) may not be linked in a single buddy-sticky group.

In some embodiments, real servers may be configured under server farms before the server farms are configured under buddy-sticky groups. In some embodiments, substantially all real servers belonging to a server farm may be configured to belong to at least one buddy-real group before the server farm can be configured under a buddy-sticky group. During configuration of a specific buddy-sticky group, Cfg_Mgr 44 may lookup object tables 46 to determine if the specific buddy-sticky group exists. If the specific buddy-sticky group exists, Cfg_Mgr 44 may invoke a download of the buddy-sticky group to DP 42.

If the specific buddy-sticky group does not exist (e.g., cannot be found in object tables 46), Cfg_Mgr 44 may create a new buddy-sticky group ID for the buddy-sticky group and create a buddy-sticky object in object tables 46. Cfg_Mgr 44 may also call LB module 52 to pull out a new buddy_sticky_type_t data structure from a global pool (e.g., container 60) and associate it with the buddy chain (e.g., a list of other buddy-sticky groups associated with the context) with an ID set by Cfg_Mgr 44. When the buddy chain is newly created, and no specific buddy-sticky group or buddy-real group is configured yet, the corresponding list may point to NULL. A bActive flag (e.g., an indicator of the active or inactive status of the buddy-group) may be set to TRUE. A dirty flag (e.g., an indicator to specify whether changes have been made to the buddy group configurations) may be set to cause a download thread update of a sticky group stats data structure (e.g., lb_sticky_group_stats_t) maintained by LB module 52.

During operation, when a first connection from client 12 to a first VIP is received, SLB 20 may direct it to a specific buddy-sticky group (e.g., SG1), and LB module 52 may lookup sticky database 58 for a matching entry. The matching entry may be based on calculation of a hash of client 12's source IP address, or other suitable parameter that can identify the sender of the connection. The lookup may return a miss, triggering computation of a new hash (e.g., C1). An entry (e.g., C1/R1) may be picked up from a free least recently used list of data structures (e.g., freeLruList) in a global pool, depending on the configuration. The entry may be populated and saved in a sticky least recently used list (e.g., stickyLruList) of the buddy-sticky object pointed to by the buddy-sticky group ID present under the sticky group stats data structure for that buddy-sticky group. A corresponding counter (e.g., sticky-conn-count) may be incremented by 1. The buddy-sticky group (represented by the buddy-sticky group ID) may be associated thus with client 12 in sticky database 58.

When a second connection from client 12 to a second VIP is received, SLB 20 may direct the second connection to another buddy-sticky group SG3. LB module 52 may lookup in sticky database 58 for hash C1 associated with client 12. If the hash is found (as would be in the example), the buddy-sticky group ID associated with the matching entry may be ascertained and compared with the buddy-sticky ID of SG3, to which the second connection is directed by SLB 20. If the buddy-sticky IDs are the same, the buddy-real group for the real server associated with the matching entry may be ascertained. A real server in the current server farm belonging to the buddy-real group may be found and sticky database 52 may be updated correspondingly. If the buddy-sticky group ID is different, a loadbalancing algorithm may be performed and a new real server may be inserted in sticky database 52.

In case of deletion of the buddy-sticky group, the sticky group stats data structure (e.g., lb_sticky_group_stats_t) may be removed from the buddy chain under the buddy-sticky object pointed to by the buddy-sticky group ID. In some embodiments, the buddy-sticky group may not be removed if there is at least one sticky group configured under the buddy-sticky group ID. When there are no more entries in the buddy chain, substantially all entries belonging to the buddy-sticky group may be returned to the global pool and set it to INACTIVE.

Figure 7:
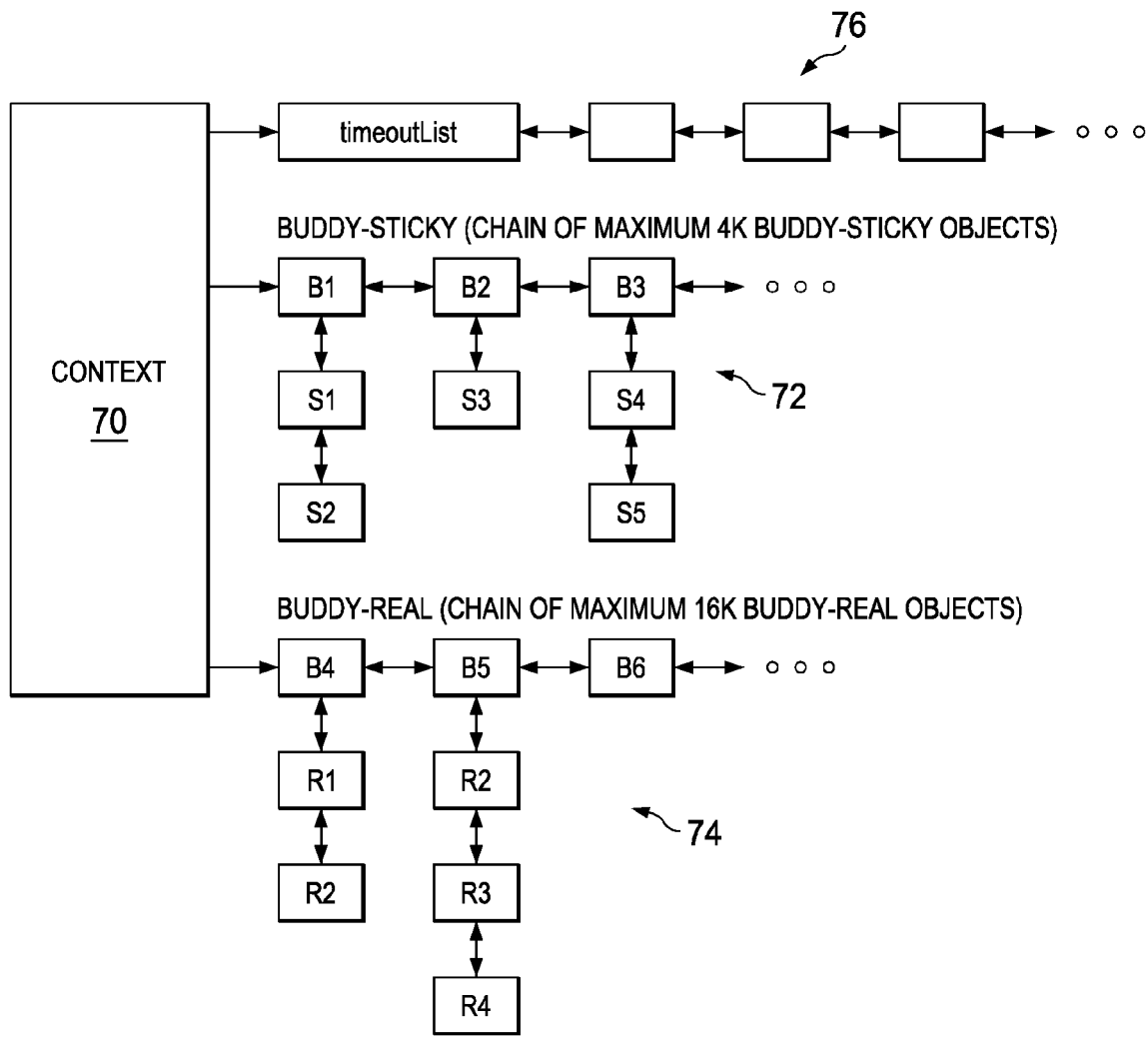
FIG. 7 is a simplified block diagram illustrating other example details of the communication system in accordance with an example embodiment.

Turning to FIG. 7, FIG. 7 is a simplified block diagram illustrating example details that may be associated with an embodiment of communication system 10. According to some embodiments, for each buddy group 32 created per context 70, two buddy chains may be added under a suitable object (e.g., data structure LbSticky_StickyContext_t): (1) a buddy-sticky chain 72; and (2) a buddy-real chain 74. Buddy-sticky chain 72 may include substantially all buddy-sticky objects (e.g., B1, B2, B3, etc.) configured for context 70 and the sticky groups (e.g., S1, S2, S3, etc.) configured for each buddy-sticky object. Buddy-real chain may include substantially all buddy-real objects (e.g., B4, B5, etc.) configured for context 70, and the real servers (R1, R2, etc.) configured for each buddy-real object. A timeout list 76 may also be generated for each buddy-chain. Time-out list 76 may maintain a list of timeouts for each buddy-sticky group and buddy-real group configured in communication system 10.

In some embodiments, context 70 may include merely buddy-real chain 74. During configuration, a buddy-real token (e.g., buddy-real group ID, say "buddy-blue") may be initialized (e.g., out of possible 16K buddy-real objects) and placed in buddy-real chain 74. Configuring "buddy blue" under real servers R1 (belonging to server farm SF1) and R2 (belonging to SF2) may put both real servers under the "buddy blue" buddy-real object (e.g., B4). When a first connection is directed to sticky group SG1, which can include server farm SF1, to which server R1 belongs, SLB 20 may lookup sticky database 52. The lookup may return a miss. Sticky packet handler 56 may insert a sticky entry in sticky database 52 for the IP address of the source (e.g., client) corresponding to the real server chosen based on loadbalancing algorithms.

A subsequent connection may be directed to sticky group SG2 and server farm SF2 and a lookup may return a hit (e.g., based on the source IP address). The real server corresponding to the matching entry may be checked to determine if the real server therein belongs to server farm SF2. As R1 does not belong to server farm SF2, the buddy-real group ("buddy blue") corresponding to R1 may be checked to determine a linked real server in server farm SF2. R2 may be discovered, and a corresponding entry may be populated in sticky database 52, sending the subsequent connection to the same parent server wherein R1 and R2 are instantiated.

Turning to FIGS. 8A-8D, FIGS. 8A-8D illustrate simplified details of example data structures configured in configuration manager 44 according to an embodiment of communication system 10. FIG. 8A illustrates a simplified data structure 80 representing a buddy-sticky group (e.g., cm_buddy_sticky_group_t). Data structure 80 may include a buddy-sticky group name (e.g., buddy_sticky_group_name), and a list (e.g., list_head_t) of sticky groups configured under the buddy-sticky group name. A buddy timeout variable (e.g., buddy_timeout) may also be set as desired. FIG. 8B illustrates a simplified data structure 82 representing a buddy-real group (e.g., cm_buddy_sfarm_real_t). Data structure 82 may include a buddy-real group name (e.g., buddy_sfarm_real_name), and a list (e.g., list_head_t) of real servers configured under the buddy-real group name.

FIG. 8C illustrates a simplified data structure 84 representing sticky-groups that includes a variable for indicating the list (e.g., list_head_t) of sticky groups to which the specific sticky group (e.g., cm_sticky_group_t) belongs in the buddy-sticky group. A Boolean variable (e.g., buddy_sticky) may indicate whether a buddy-sticky group has been configured for the specific sticky group. FIG. 8D illustrates a simplified data structure 86 representing server farms that includes a variable for indicating the list (e.g., list_head_t) of real servers to which the specific server farm (e.g., cm_sfarm_real_t) belongs in the buddy-real group. A Boolean variable (e.g., buddy_real) may indicate whether a buddy-real group has been configured for the specific server farm.

Turning to FIGS. 9A-9E, FIGS. 9A-9E illustrate simplified details of example data structures configured in LB module 52 according to an embodiment of communication system 10. FIG. 9A illustrates a simplified data structure 90 representing a specific context (LbSticky_StickyContext_t). Pointers to the buddy-sticky group and the buddy-real group may be suitably defined, for example, as buddy_sticky_type_t and buddy_real_server_type_t, respectively.

FIG. 9B illustrates a simplified data structure 92 representing a container for a buddy-sticky group (e.g., buddy_sticky_type_t). The data structure may indicate the buddy-sticky group ID, timeout, IPv4 Netmask, etc. A chain of data structures 92 may be linked together for each context 70. In an example embodiment, 4K buddy-sticky containers may be defined globally. Each container can contain a list of hybrid lb_buddy_sticky_group_stats_t and a list of sticky entries by timeout. When Cfg_Mgr 44 creates a new buddy-sticky group ID, LB module 52 may pull out a buddy_sticky_type_t structure and add it to the chain. FIG. 9C illustrates a simplified data structure 94 representing a container for a buddy-real group (e.g., buddy_real_server_type_t). The data structure may indicate the buddy-real group ID, and other appropriate parameters. A chain of data structures 94 may be linked together for each context 70. In an example embodiment, 16K buddy-real containers may be defined globally. Each container can contain a list of lb_real_server_stats_t (e.g., list of real servers configured with the buddy-real group ID). When Cfg_Mgr 44 creates a new buddy-real group ID, LB module 52 may pull out a buddy_real_server_t structure and add it to the chain.

FIG. 9D illustrates a simplified data structure 96 that may be chained (e.g., linked) under the buddy-real group ID. Data structure 96 may indicate the real server ID, the server farm ID, and other suitable information under an appropriate name (e.g., lb_buddy_real_server_info_t). FIG. 9E illustrates a simplified data structure 98 that represents a hybrid sticky group structure. Data structure 98 (e.g., lb_sticky_group_stats_t) may indicate the buddy-sticky group (e.g., bBuddyStickyGroup) and buddy-sticky ID (e.g., buddy_sticky_id_t) among other parameters.

Figure 10A:
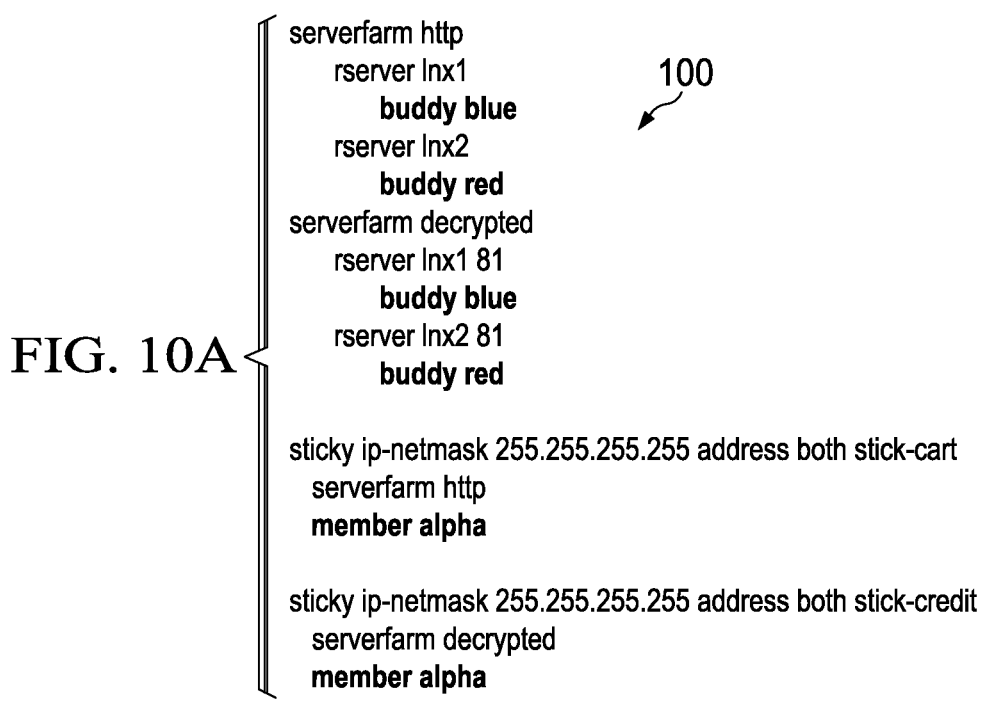
FIG. 10A is a simplified diagram illustrating yet other example details of an embodiment of the communication system.
Figure 10B:
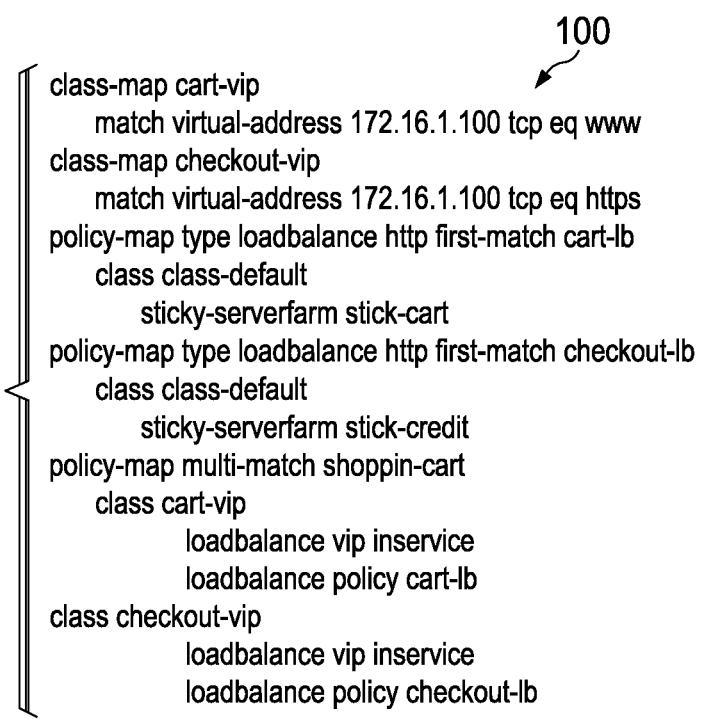
FIG. 10B is a simplified diagram illustrating yet other example details of an embodiment of the communication system.

Turning to FIGS. 10A-10B, FIGS. 10A-10B represent an example configuration 100 associated with an embodiment of communication system 10. According to example configuration 100 of FIG. 10A, real server 'lnx1,' belonging to server farm 'http' may be linked to real server 'lnx1 81' belonging to server farm 'decrypted' in a buddy group named 'blue.' Another real server 'lnx2' belonging to server farm 'http' may be linked to real server 'lnx2 81' belonging to server farm 'decrypted' in another buddy group named 'red.' A buddy-sticky group named 'alpha' may comprise a sticky group 'stick-cart' having a Netmask of 255.255.255.255 for both source and destination addresses, and server farm 'http,' and another sticky group 'stick-credit' having a Netmask of 255.255.255.255 for both source and destination addresses, and server farm 'decrypted.' Suitable policies may be configured, as illustrated in FIG. 10B, to link http traffic to VIP 172.16.1.100 with sticky group 'stick-cart,' and https traffic to VIP 172.16.1.100 with sticky group 'stick-credit.'

Figure 11A:
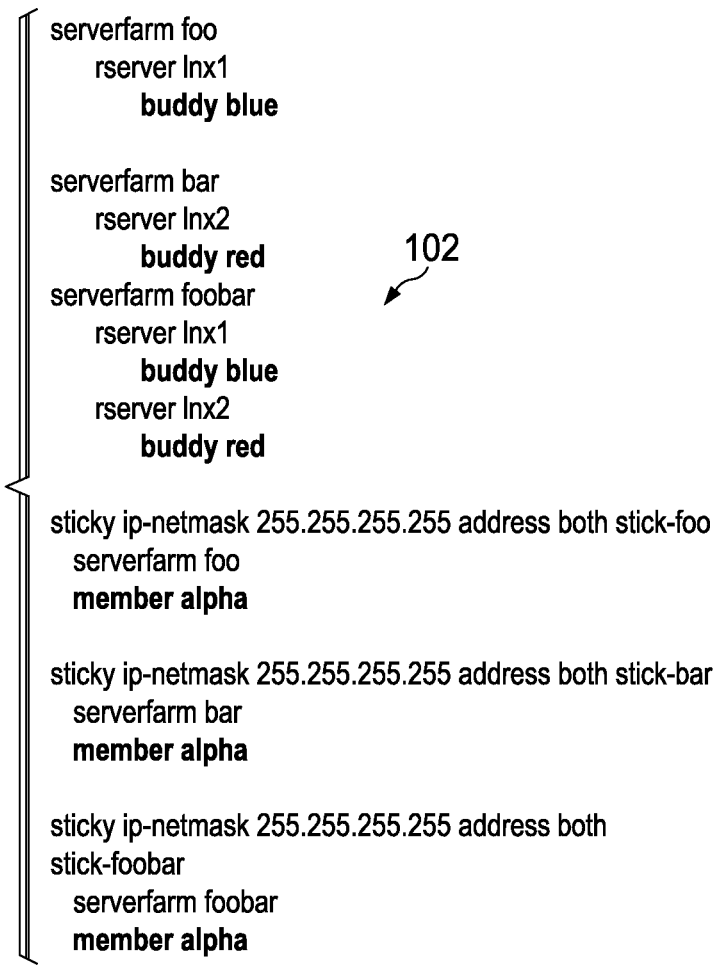
FIG. 11A is a simplified diagram illustrating yet other example details of an embodiment of the communication system.

Turning to FIGS. 11A-11B, FIGS. 11A-11B represent an example configuration 102 associated with an embodiment of communication system 10. According to example configuration 102 of FIG. 11A, real server 'lnx1,' belonging to server farm 'foo' may be linked to the same real server 'lnx1' belonging to server farm 'foobar' in a buddy group named 'blue.' Another real server 'lnx2' belonging to server farm 'bar' may be linked to the same real server 'lnx2' belonging to server farm 'foobar' in another buddy group named 'red.' A buddy-sticky group named 'alpha' may comprise a sticky group 'stick-foo' having a Netmask of 255.255.255.255 for both source and destination addresses, and server farm 'foo,' and another sticky group 'stick-bar' having a Netmask of 255.255.255.255 for both source and destination addresses, and server farm 'bar,' and yet another sticky group 'stick-foobar' having a Netmask of 255.255.255.255 for both source and destination addresses, and server farm 'foobar.' Suitable policies may be configured, as illustrated in FIG. 11B, to associate a certain class of traffic to VIP 172.16.1.100 with sticky server farm foo, another class of traffic to the same VIP with sticky server farm bar, and a default class of traffic to the same VIP with sticky server farm foobar.

Figure 12A:
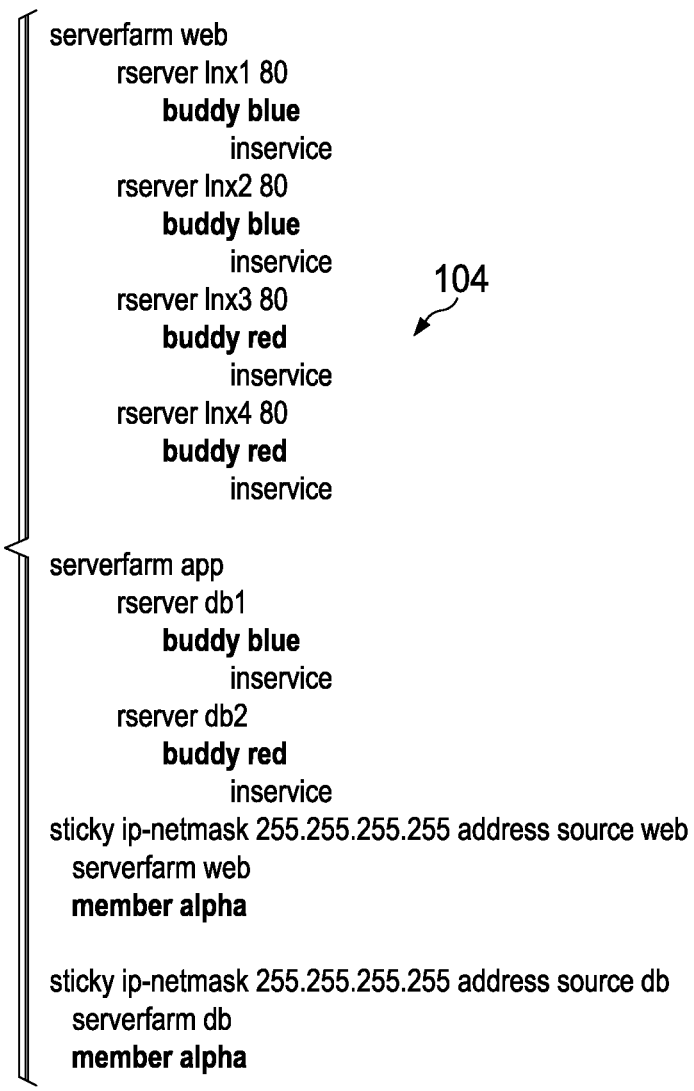
FIG. 12A is a simplified diagram illustrating yet other example details of an embodiment of the communication system.
Figure 12B:
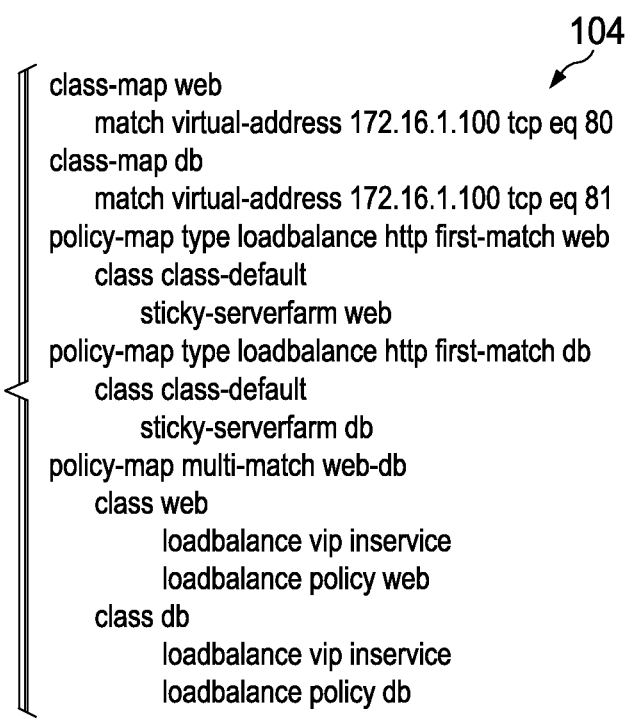
FIG. 12B is a simplified diagram illustrating yet other example details of an embodiment of the communication system.

Turning to FIGS. 12A-12B, FIGS. 12A-12B represent an example configuration 104 associated with an embodiment of communication system 10. According to example configuration 104 of FIG. 12A, real server 'lnx1 80,' belonging to server farm 'web' may be linked to real server 'lnx2 80' belonging to the same server farm 'web' and another real server 'db1' belonging to server farm 'app' in a buddy group named 'blue.' Another real server 'lnx3 80,' belonging to server farm 'web' may be linked to real server 'lnx4 80' belonging to the same server farm 'web' and another real server 'db2' belonging to server farm 'app' in another buddy group named 'red.' A buddy-sticky group named 'alpha' may comprise a sticky group 'web' having a Netmask of 255.255.255.255 for source addresses, and server farm 'web,' and another sticky group 'db' having a Netmask of 255.255.255.255 for source addresses, and server farm 'app.' Suitable policies may be configured, as illustrated in FIG. 12B, to associate a certain traffic to VIP 172.16.1.100 port 80 with server farm web, and traffic to VIP 172.16.1.100 port 81 with server farm app.

Figure 13C:
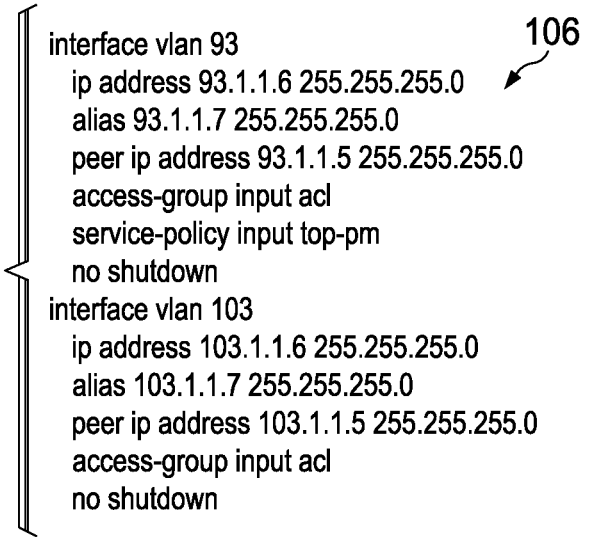
FIG. 13C is a simplified diagram illustrating yet other example details of an embodiment of the communication system.

Turning to FIGS. 13A-13C, FIGS. 13A-13C represent an example configuration 106 associated with an embodiment of communication system 10. According to example configuration 106 of FIG. 13A, real server 'RS1,' belonging to server farm 'SF1' may be linked to real server 'RS1 443' belonging to the server farm 'SF2' in a buddy group named 'blue.' Another real server 'RS2,' belonging to server farm 'SF1' may be linked to real server 'RS2 443' belonging to the server farm 'SF2' in another buddy group named 'red.' A buddy-sticky group named 'alpha' may comprise a sticky group 'SG1' having a Netmask of 255.255.255.255 for source addresses, timeout of 100 and server farm 'SF1,' and another sticky group 'SG2' having a Netmask of 255.255.255.255 for source addresses, and server farm 'SF2.' Suitable policies may be configured, as illustrated in FIGS. 13B and 13C, to associate certain types of traffic with certain sticky groups. For example, traffic to VIP 93.1.1.100 port 80 may be directed to sticky group SG1, and traffic to VIP 93.1.1.100 port 443 may be directed to sticky group SG2.

Figure 14:
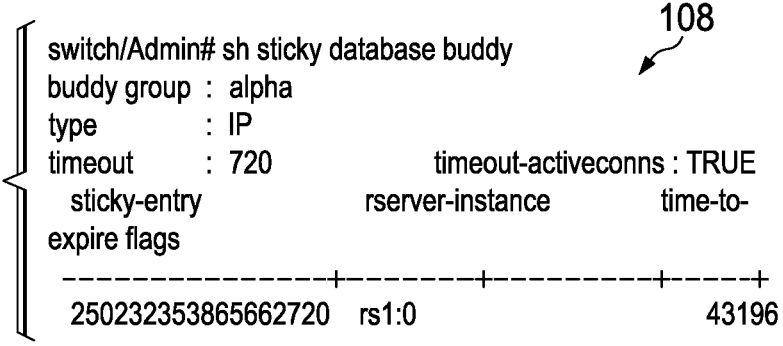
FIG. 14 is a simplified diagram illustrating yet other example details of an embodiment of the communication system.

Turning to FIG. 14, FIG. 14 is a simplified CLI display 108 according to an example embodiment of communication system 10. A suitable command (e.g., sh sticky database buddy) to show the sticky database for buddy groups may display the sticky entry, real server instance, and time-to-expire flags.

Turning to FIG. 15, FIG. 15 is a simplified CLI display 110 according to an example embodiment of communication system 10. A suitable command (e.g., sh rserver detail) to show real server details may indicate the buddy group associated with the real server across server farms. In the example display 110, real server rs1 may be associated with server farm sf1 in a buddy-real group 'blue,' and with server farm sf2 in another buddy-real group 'green.'

Turning to FIG. 16, FIG. 16 is a simplified CLI display 112 according to an example embodiment of communication system 10. A suitable command (e.g., sh serverfarm detail) to show server farm details may indicate the buddy groups associated with the server farm. In the example display 112, server farm sf1 may include real server rs1 in a buddy-real group 'blue,' and real server 'rs2' in another buddy-real group 'green.'

Turning to FIG. 17, FIG. 17 is a simplified CLI display 114 according to an example embodiment of communication system 10. A suitable command (e.g., sh stats sticky) may be configured to show sticky statistics, including the number of buddy-sticky groups configured, and the number of buddy connections.

Turning to FIGS. 18A-18B, FIGS. 18A-18B are simplified CLI displays according to an example embodiment of communication system 10. According to example CLI display 116, a suitable command (e.g., sh buddy group) may be configured to show a summary of the various buddy groups configured in buddy-sticky module 26, including associated server farms and real servers. According to example CLI display 118, a suitable command (e.g., sh buddy group Blue) may indicate details of the specific buddy group (e.g., Blue) listed in the command. According to example CLI display 120, a suitable command (e.g., sh buddy group detail) may indicate details of buddy groups configured in buddy-sticky module 26.

Figure 19:
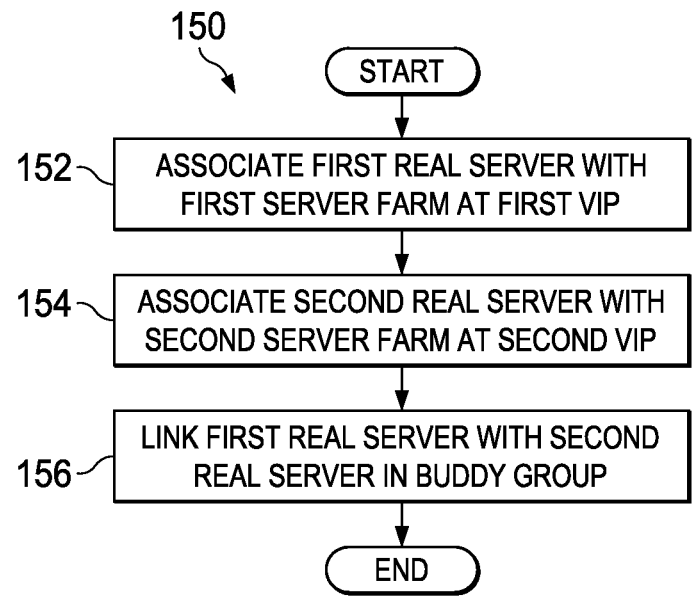
FIG. 19 is a simplified flow diagram illustrating example operations that may be associated with an embodiment of the communication system.

Turning to FIG. 19, FIG. 19 is a simplified flow diagram illustrating example operations 150 that may be associated with embodiments of communication system 10. At 152, a first real server (e.g., 23(1)) may be associated with a first server farm (e.g., 24(1)) attached to a first VIP. At 154, a second real server (e.g., 23(2)) may be associated with a second server farm (e.g., 24(2)) attached to a second VIP. At 156, the first real server (e.g., 23(1)) may be linked with the second real server (e.g., 23(2)) in a buddy group (e.g., 32).

Figure 20:
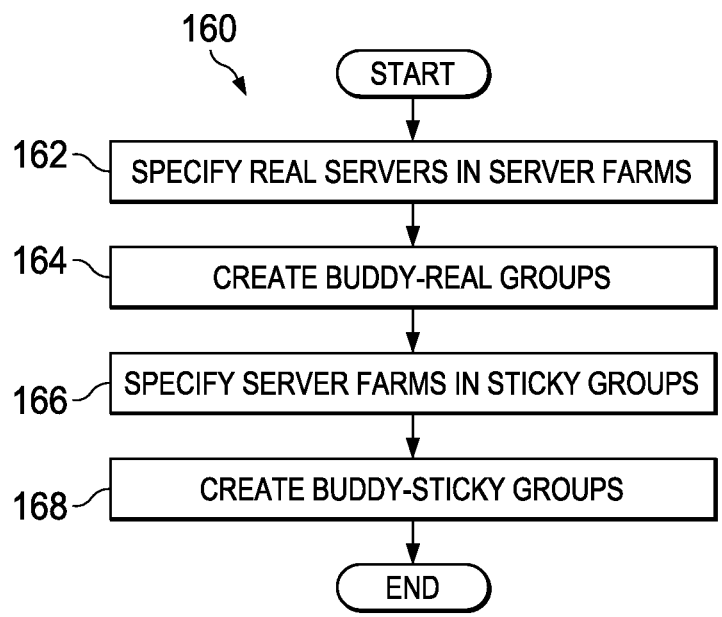
FIG. 20 is a simplified flow diagram illustrating other example operations that may be associated with an embodiment of the communication system.

Turning to FIG. 20, FIG. 20 is a simplified flow diagram illustrating example operations 160 that may be associated with embodiments of communication system 10. At 162, real servers may be specified as being associated with, or belonging to, server farms. For example, real servers 23(1), 23(3), 23(4), and 23(6) may be associated with server farm 24(1); real servers 23(2), 23(6), and 23(5) may be associated with server farm 24(2). At 164, buddy-real groups may be created. For example, real servers 23(1) and 23(2) may be linked in buddy group 36(1); real server 23(6) at server farm 24(1) may be linked to real server 23(6) at server farm 24(2)); and so on. At 166, server farms may be specified as being associated with, or belonging to sticky groups. For example, each server farm 24(1) and 24(2) may be associated with corresponding sticky groups. At 168, a buddy-sticky group may be created. For example, server farms 24(1) and 24(2) may be associated with buddy-sticky group 34(1).

Figure 21:
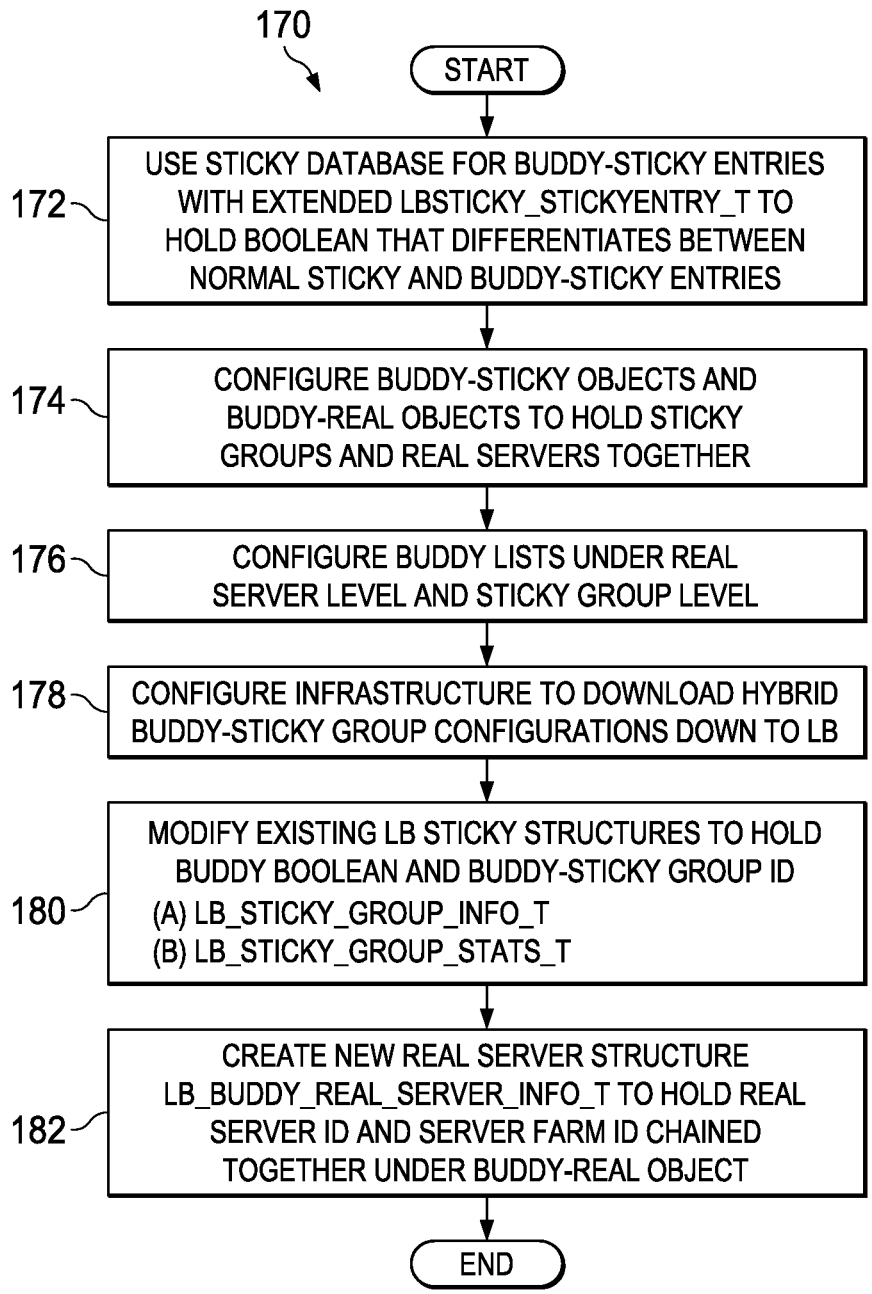
FIG. 21 is a simplified flow diagram illustrating yet other example operations that may be associated with an embodiment of the communication system.

Turning to FIG. 21, FIG. 21 is a simplified flow diagram illustrating example operations 170 that may be associated with LB module 52 according to embodiments of communication system 10. At 172, sticky database 58 may be used for buddy-sticky entries with an extended data structure LbSticky_StickyEntry_t to hold a Boolean that differentiates between normal sticky entries (e.g., sticky groups) and buddy-sticky entries (e.g., buddy-sticky groups). At 174, buddy-sticky objects and buddy-real objects may be configured to hold sticky groups and real servers together. At 176, buddy lists may be configured under the real server level and the sticky group level. At 178, the infrastructure may be configured to download hybrid buddy-sticky group configurations down to LB module 52. At 180, existing loadbalancer sticky data structures may be modified to hold buddy Boolean and buddy-sticky group IDs, for example, using variables such as lb_sticky_group_info_t and lb_sticky_group_stats_t. At 180, new real server structure lb_buddy_real_server_info_t may be created to hold a real server ID and server farm ID chained together under a buddy-real chain (e.g., buddy-real chain 74).

Figure 22:
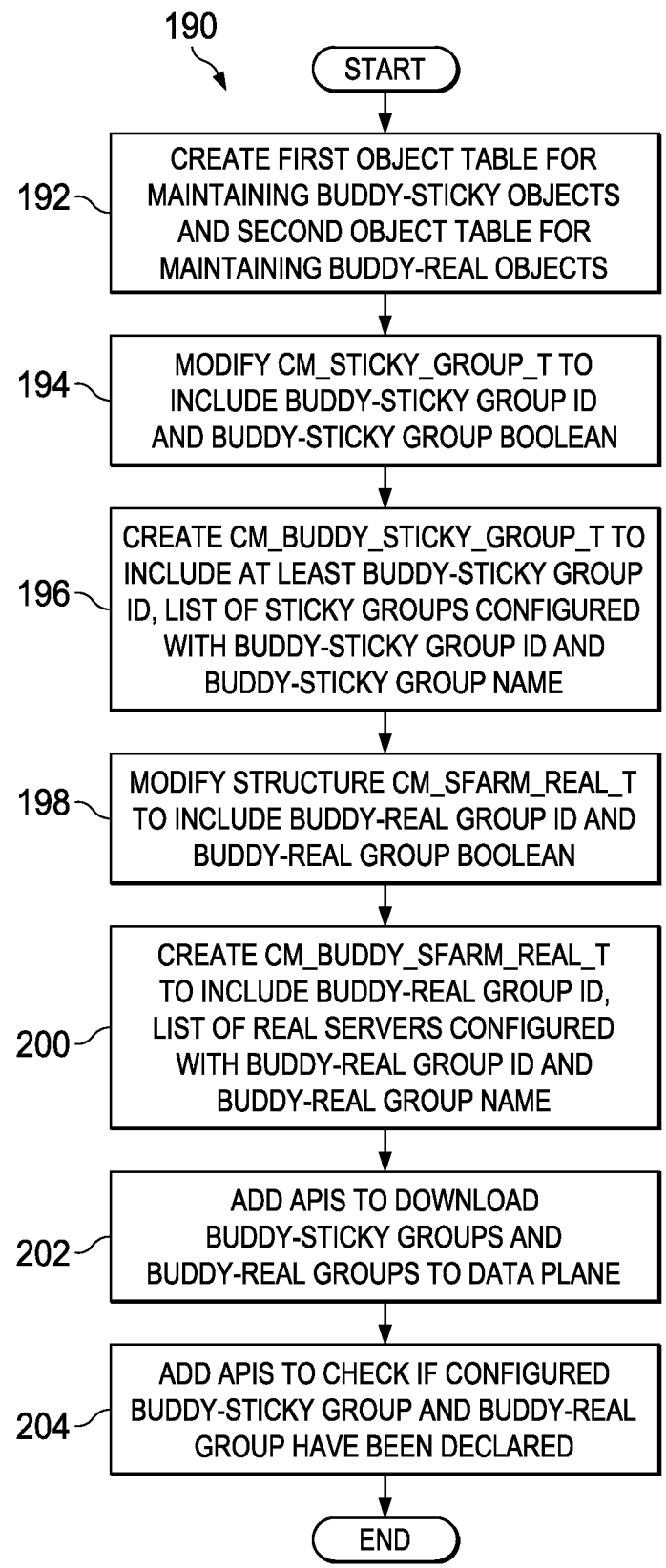
FIG. 22 is a simplified flow diagram illustrating yet other example operations that may be associated with an embodiment of the communication system.

Turning to FIG. 22, FIG. 22 is a simplified flow diagram illustrating example operations 190 that may be associated with Cfg_Mgr 44 according to embodiments of communication system 10. At 192, a first object table for maintaining buddy-sticky objects may be created. A second object table for maintaining buddy-real objects may also be created. At 194, cm_sticky_group_t data structure may be modified to include a buddy-sticky group ID and a buddy-sticky group Boolean (e.g., indicating whether any buddy-sticky group has been configured with the sticky group). At 196, a data structure, (e.g., cm_buddy_sticky_group_t) to hold the buddy-sticky group information may be created to include at least a buddy-sticky group ID, a list of sticky groups configured with the buddy-sticky group ID, and a buddy-sticky group name.

At 198, a data structure (e.g., cm_sfarm_real_t) that holds the server farm configuration may be modified to include the buddy-real group ID and the buddy-real group Boolean (e.g., to indicate if the real servers are associated with any buddy-real groups). At 200, a data structure (e.g., cm_buddy_sfarm_real_t) to hold the buddy-real group information may be created to include at least a buddy-real group ID, a list of real servers configured with the buddy-real group ID and the buddy-real group name. At 202, suitable APIs may be added to download buddy-sticky groups and buddy-real groups to data plane 42. At 204, suitable APIs may be added to check if configured buddy-sticky groups and buddy-real groups have been declared, or otherwise exist, in sticky database 58.

Figure 23:
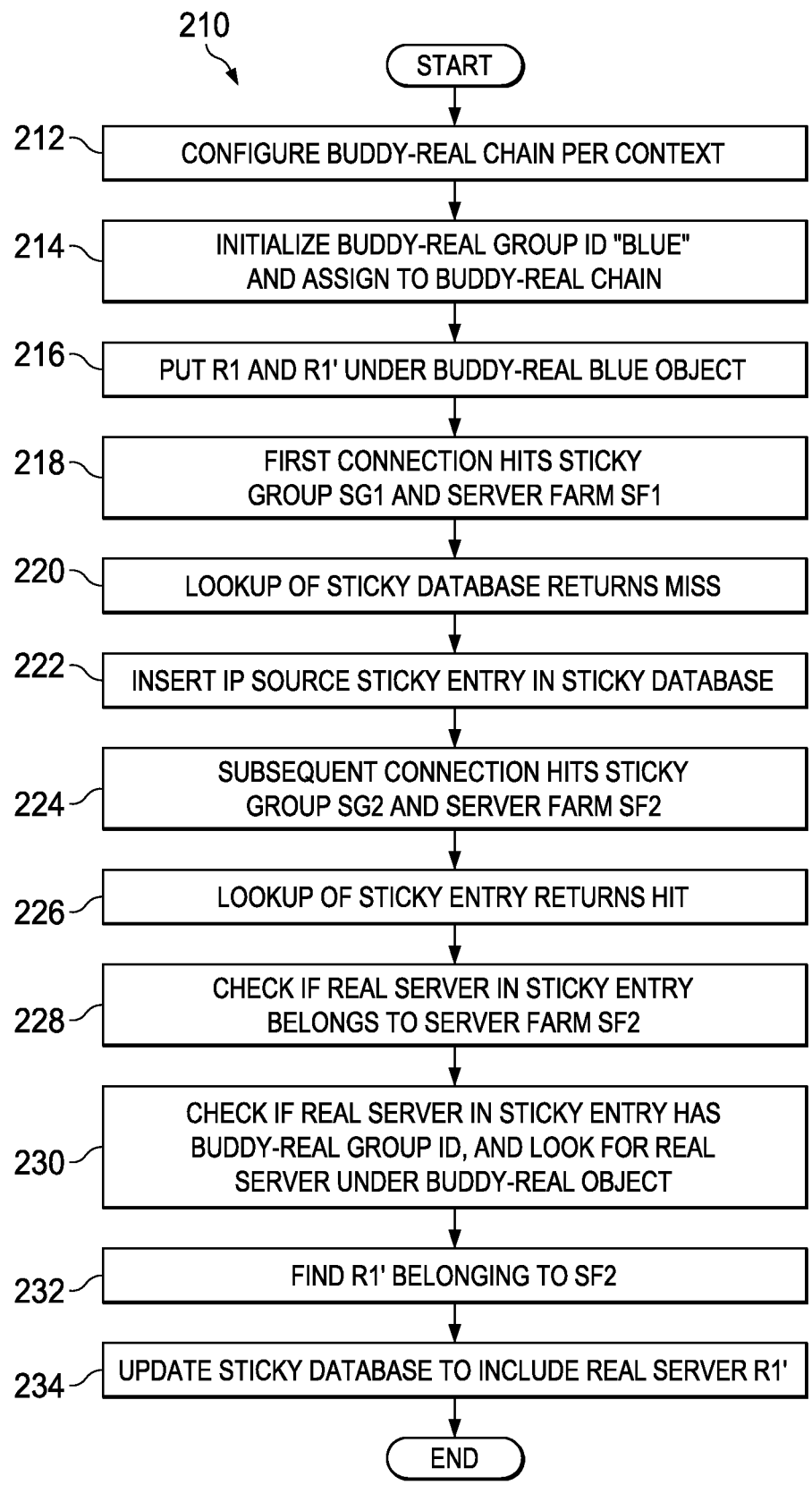
FIG. 23 is a simplified flow diagram illustrating yet other example operations that may be associated with an embodiment of the communication system.

Turning to FIG. 23, FIG. 23 is a simplified flow diagram illustrating example operations 210 that may be associated with buddy sticky module 26 according to embodiments of communication system 10. At 212, buddy-real chain 74 per context 70 may be configured. At 214, an example buddy-real token "blue" may be initialized and assigned to buddy-real chain 74. At 216, real servers R1 and R1' may be placed under the buddy-real blue object. R1 may belong to server farm SF1 that may be associated with sticky group SG1; R1' may belong to server farm SF2 that may be associated with sticky group SG2.

At 218, a first connection from client 12 may hit (e.g., be directed to) sticky group SG1 and server farm SF1. At 220, a lookup of sticky database 58 may return a miss (e.g., because connection is encountered for a first time). At 222, an IP source sticky entry (e.g., sticky entry based on the IP source address) may be entered in sticky database 58, based on the real server determined by SLB 20. For example, a hash (e.g., C1) may be calculated and an entry (e.g., C1/R1) may be entered in sticky database 58. At 224, a subsequent connection from client 12 may hit sticky group SG2 and server farm SF2. At 226, a lookup of sticky entries in sticky database 58 based on the hash (C1) may return a hit (e.g., C1/R1). At 228, sticky packet handler 56 may check if the entry includes a real server in server farm SF2. If not (as in the example scenario), at 230, sticky packet handler 56 may check if the real server in the entry belongs to a buddy-real group. In the example scenario, R1 belongs to buddy-real blue. At 232, R1' belonging to SF2 may be found to belong to the same buddy-real group as R1 from the matching entry. At 234, sticky database 58 may be updated to include real server R1'.

Figure 24:
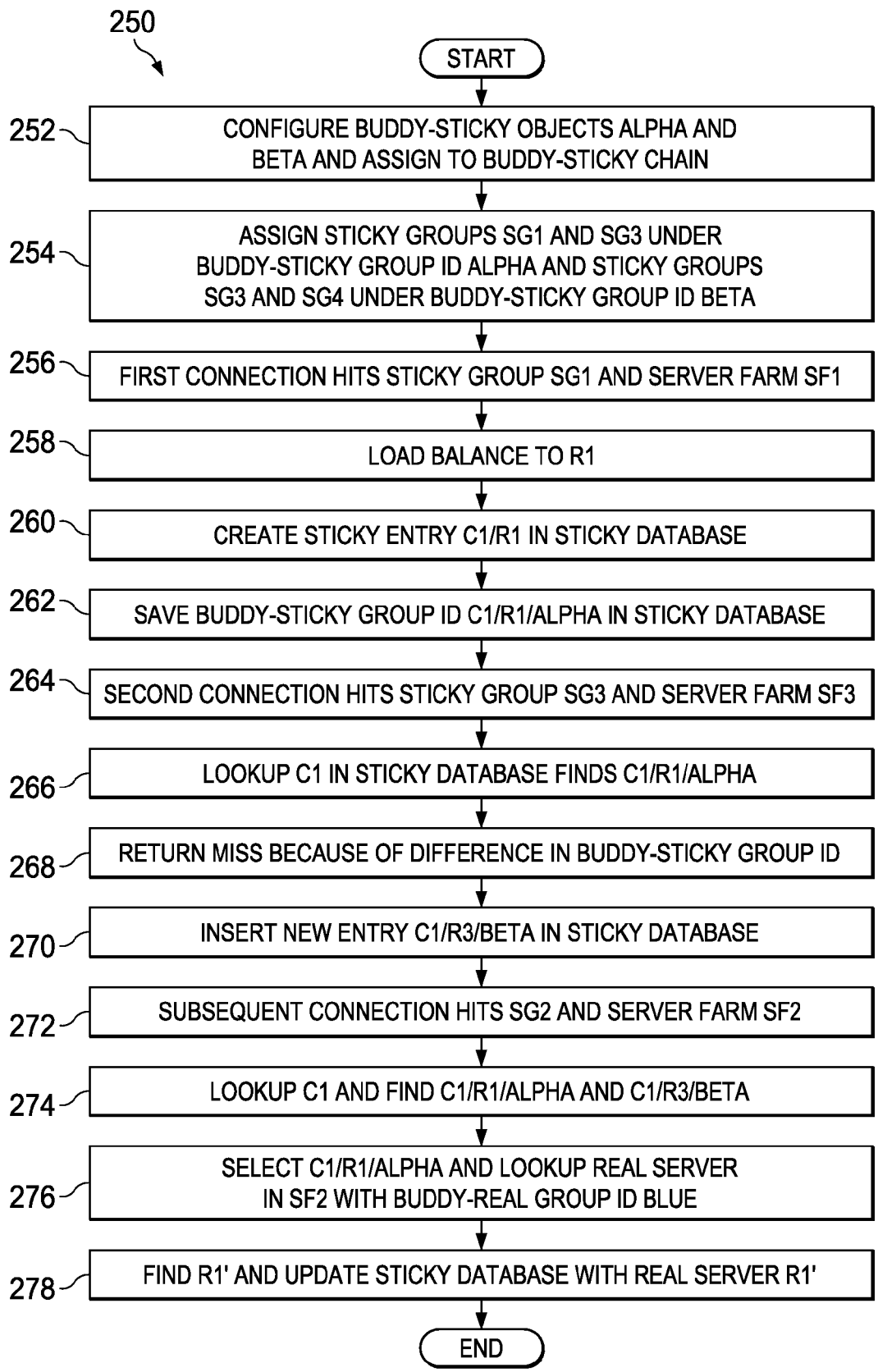
FIG. 24 is a simplified flow diagram illustrating yet other example operations that may be associated with an embodiment of the communication system.

Turning to FIG. 24, FIG. 24 is a simplified flow diagram illustrating example operations 250 that may be associated with embodiments of communication system 10. At 252, buddy-sticky objects (e.g., named alpha and beta) may be configured in buddy sticky module 26 and assigned to buddy-sticky chain 72. At 254, sticky groups SG1 and SG2 may be assigned under buddy-sticky group alpha (e.g., identified by an "alpha" group ID) and sticky groups SG3 and SG4 may be assigned under buddy-sticky group beta (e.g., identified by a "beta" group ID). SG1 may include server farm SF1, which includes real servers R1 and R2; SG2 may include server farm SF2, which includes real servers R1' and R2'; SG3 may include server farm SF3, which includes real servers R3 and R4; G4 may include server farm SF4, which includes real servers R3' and R4'. Real servers R1 and R1' may be linked in a buddy-real group named 'blue;' R2 and R2' may be linked in another buddy-real group named 'red;' R3 and R3' may be linked in yet another buddy-real group named 'green;' and R4 and R4' may be linked in yet another buddy-real object named 'yellow.'

At 256, a first connection from client 12 may hit sticky group SG1 and corresponding server farm SF1. SLB 20 may loadbalance the first connection to real server R1. At 260, a sticky entry (e.g., C1/R1) may be entered in sticky database 58. At 262, the buddy-sticky group ID may be saved into the sticky entry, for example, as C1/R1/alpha, in sticky database 58. At 264, a second connection from client 12 may be directed by SLB 20 to sticky group SG3 and server farm SF3. At 266, a lookup for C1 in sticky database 58 may find entry C1/R1/alpha. At 268, a miss may be returned because the buddy-sticky group ID 'alpha' in the matching entry is different from the buddy-sticky group ID 'beta' of sticky group SG3. At 270, a new entry C1/R3/beta may be entered in sticky database 58.

At 272, a subsequent connection from client 12 may be directed to SG2 and server farm SF2. At 274, a lookup of C1 in sticky database 58 may return two entries: C1/R1/alpha and C1/R3/beta. At 276, C1/R1/alpha may be chosen (e.g., because of matching buddy-sticky group IDs) and a determination may be made that R1 belongs to buddy-real group blue. A lookup of real servers in SF2 belonging to buddy-real group blue may be performed. At 278, R1' in SF2 may be found, and sticky database 58 may be updated with the corresponding entry including real server R1'.

Figure 25:
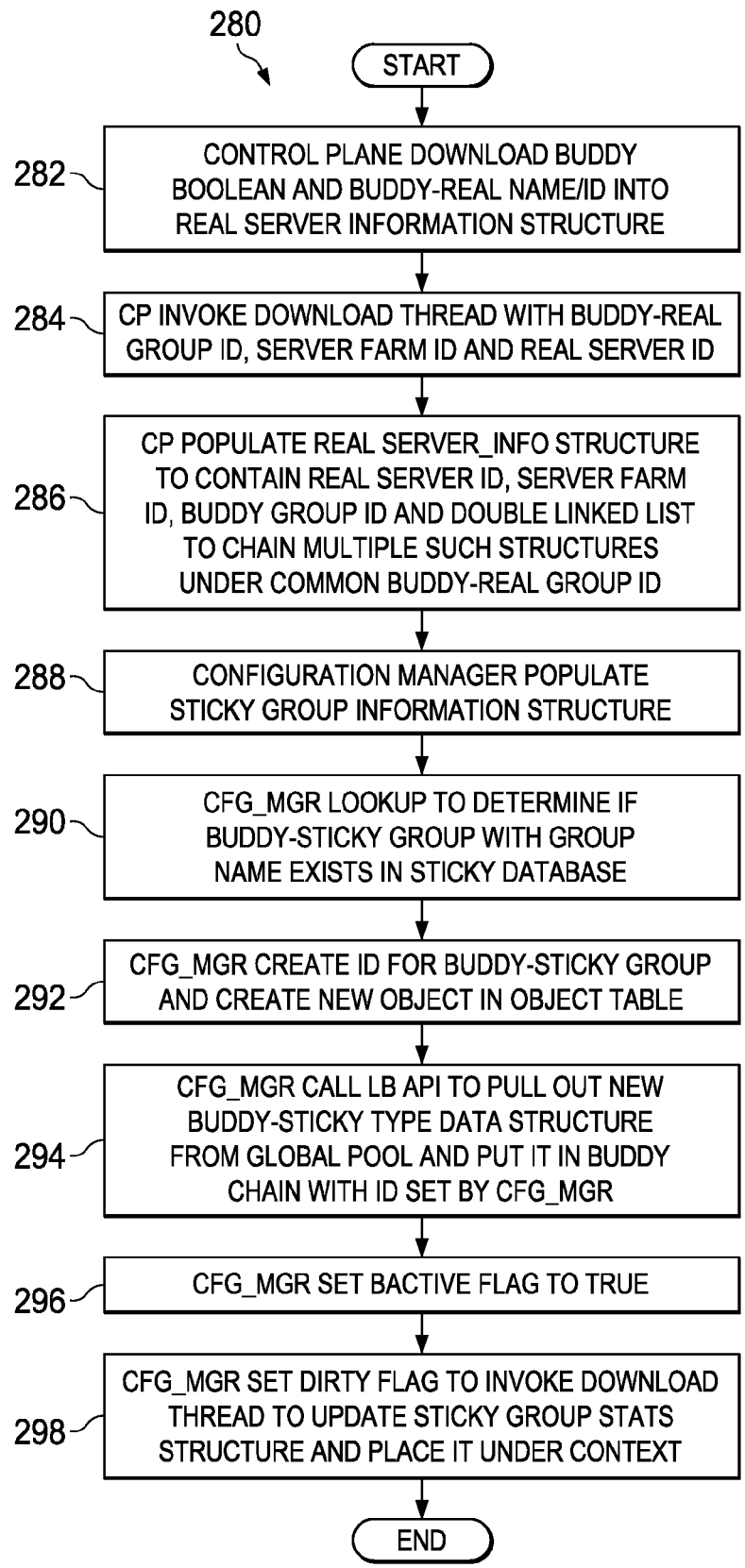
FIG. 25 is a simplified flow diagram illustrating yet other example operations that may be associated with an embodiment of the communication system.

Turning to FIG. 25, FIG. 25 is a simplified flow diagram illustrating example operations 280 that may be associated with Cfg_Mgr 44 according to embodiments of communication system 10. At 182, CP 40 may download the buddy Boolean and buddy-real group name (or ID) into a real server info structure. At 284, CP 40 may invoke a download thread with the buddy-real group ID, server farm ID and real server ID. At 286, CP 40 may populate the real server info structure to include the real server ID, server farm ID, buddy-real group ID, and a double linked list to chain multiple such structures under a common buddy-real group token. At 288, Cfg_Mgr 44 may populate a sticky group information ("info") data structure with information pertaining to the buddy-sticky groups.

At 290, Cfg_Mgr 44 may lookup object tables 46 to determine if any buddy-sticky group with the group name (or ID) exists (e.g., has already been declared or configured). At 292, Cfg_Mgr 44 may create a new group ID (e.g., if there are no previously configured buddy-sticky groups with the group ID) for the buddy-sticky group and create a corresponding new buddy-sticky object in object tables 46. At 294, Cfg_Mgr 44 may call an API to pull out (e.g., retrieve) a new buddy-sticky type data structure from a global pool and put it in (e.g., associate with) buddy-sticky chain 72 with the ID set by Cfg_Mgr 44. At 296, a bActive flag may be set to true by Cfg_Mgr 44 to indicate an active status of the buddy-sticky group. At 298, Cfg_Mgr 44 may set a dirty flag to invoke a download thread that can update a sticky group stats info data structure in DP 42 and place it under context 70.

Figure 26:
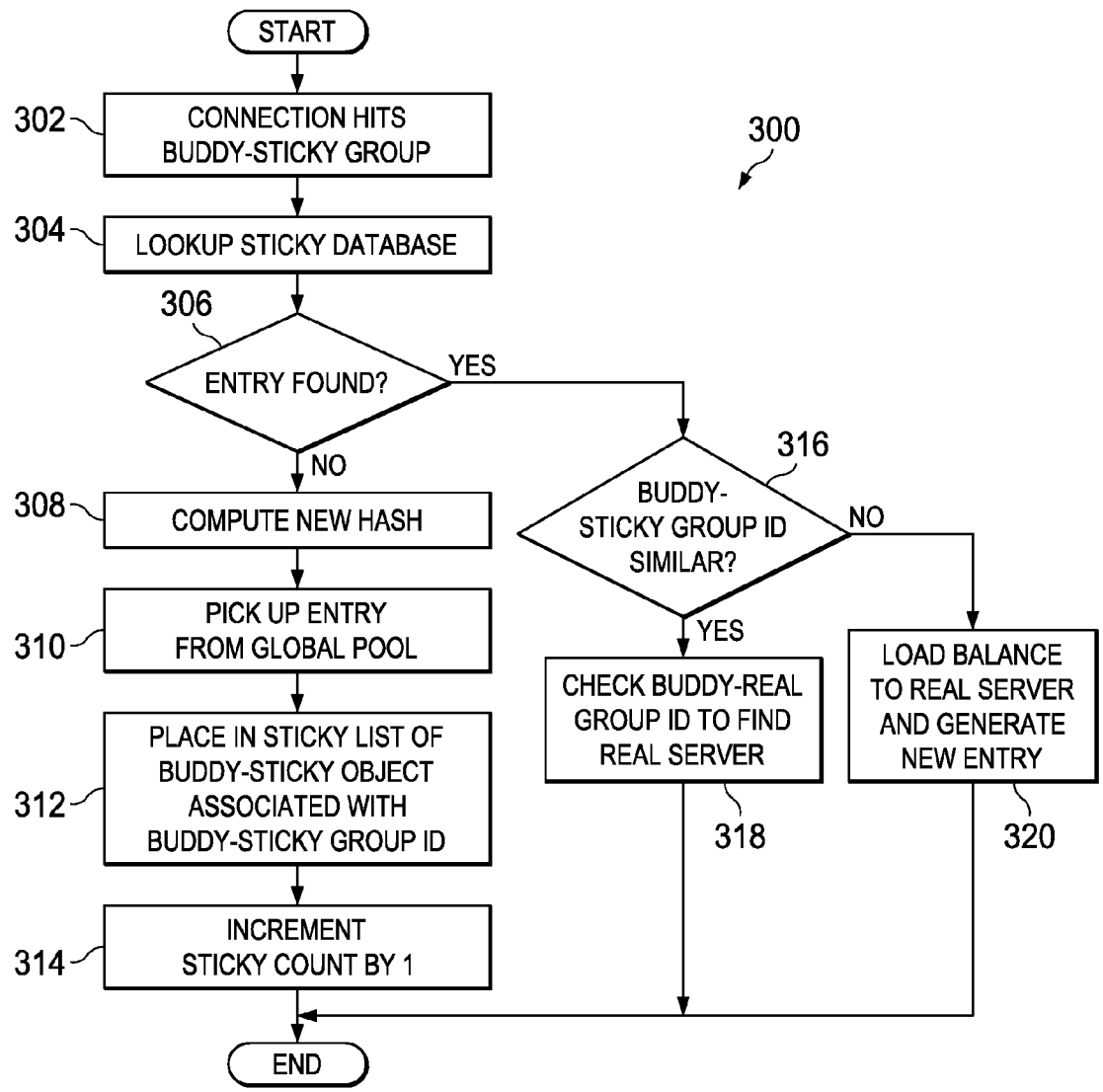
FIG. 26 is a simplified flow diagram illustrating yet other example operations that may be associated with an embodiment of the communication system.

Turning to FIG. 26, FIG. 26 is a simplified flow diagram illustrating example operations 300 that may be associated with embodiments of communication system 10. At 302, a connection from client 12 may hit a specific buddy-sticky group (e.g., SG1). At 204, sticky database 58 may be looked up for a matching entry. The matching entry may correspond to a hash (e.g., C1) computed based on desired stickiness considerations, for example, source IP address. At 306, a determination may be made if a matching entry exists in sticky database 58. If a matching entry does not exist, at 308, a new hash (e.g., C1) may be computed. At 310, an entry (e.g., data structure) may be picked up (e.g., selected) from a global pool (e.g., a group of data structures or other similar objects). At 312, the selected data structure may be placed in a sticky list of buddy-sticky object associated with the buddy-sticky group ID. At 314, a sticky count may be incremented by one.

Turning back to 306, if a matching entry is found in sticky database 58, at 316, a determination may be made whether the buddy-sticky group ID of the matching entry is similar to the buddy-sticky group ID of the sticky group to which the connection was directed at 302. If the buddy-sticky group ID is similar, at 318, the buddy-real group associated with the real server in the matching entry may be checked to identify another real server in the server farm associated with the sticky group to which the connection was directed at 302. If the buddy-sticky group ID is not similar, at 320, the connection may be loadbalanced to any suitable real-server in the sticky group and a new entry may be generated in sticky database 58.

Figure 27:
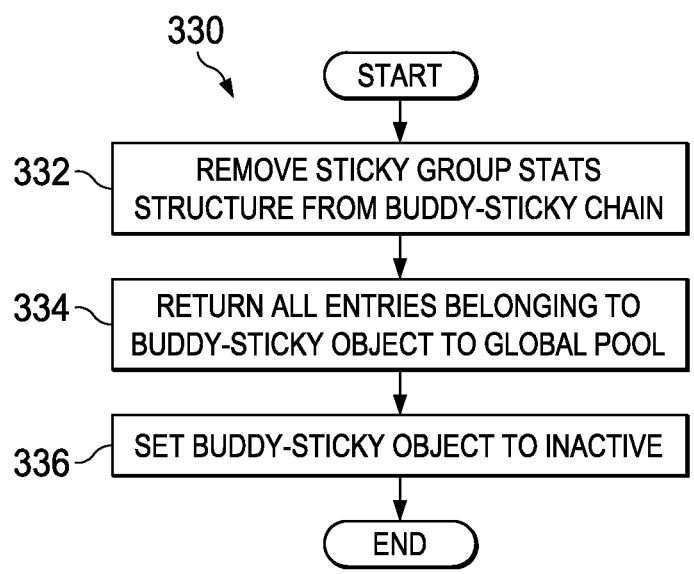
FIG. 27 is a simplified flow diagram illustrating yet other example operational activities that may be associated with embodiments of communication system.

Turning to FIG. 27, FIG. 27 is a simplified flow diagram illustrating example operations 330 that may be associated with deleting a buddy-sticky group according to embodiments of communication system 10. At 332, the sticky group stats structure (which stores statistical information pertaining to the buddy-sticky groups) may be removed from buddy-sticky chain 72. At 334, substantially all entries belonging to the buddy-sticky object may be returned to the global pool (e.g., container 60). In some embodiments, the buddy-sticky object may not be removed if even a single sticky group is configured therein. In some embodiments, returning the entries may include deleting values of parameters and/or variables in the corresponding data structure. At 336, the buddy-sticky object may be set to inactive.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, SLB 20. In some embodiments, one or more of these features may be implemented in hardware, provided external to these elements, or consolidated in any appropriate manner to achieve the intended functionality. The various network elements (e.g., servers, SLBs) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, SLB 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 68) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 66) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    associating a first real server with a first server farm attached to a first virtual Internet Protocol address (VIP), wherein the first real server is configured to service a first connection from a client to the first VIP in a network environment;
    associating a second real server with a second server farm attached to a second VIP, wherein the second real server is configured to service a second connection from the client to the second VIP in the network environment;
    linking the first real server with the second real server in a particular group; and
    facilitating connection persistence of the first connection with the second connection across the first server farm and the second server farm, wherein the facilitating connection persistence comprises:
    directing the first connection from the client to the first real server;
    associating the particular group with the client through an entry in a sticky database;
    receiving the second connection from the client;
    identifying the particular group associated with the client, wherein the identifying comprises looking up the entry in the sticky database;
    identifying the second real server belonging to the particular group; and
    directing the second connection to the second real server.

2. The method of claim 1, wherein the first real server and the second real server represent respective instantiations of a particular server at a first port and a second port of the particular server.

3. The method of claim 2, wherein the first connection and the second connection are serviced by the particular server to achieve connection persistence.

4. The method of claim 1, wherein the first real server is identical to the second real server, and wherein the first server farm is different from the second server farm.

5. The method of claim 1, wherein the first real server is different from the second real server, and wherein the first server farm is different from the second server farm.

6. The method of claim 1, further comprising:
    associating a third real server with the first server farm at the first VIP, wherein the third real server is configured to service the first connection to the first VIP, wherein the first connection is loadbalanced across the first real server and the second real server; and
    linking the first real server, the second real server, and the third real server in the particular group.

7. The method of claim 1, wherein the particular group comprises a buddy-sticky group and a buddy-real group, wherein the buddy-sticky group comprises the first server farm and the second server farm, and the buddy-real group comprises the first real server and the second real server.

8. The method of claim 7, wherein associating the particular group with the client comprises associating the buddy-sticky group with the client, wherein identifying the particular group associated with the client comprises identifying the buddy-sticky group associated with the client, wherein identifying the second real server belonging to the particular group comprises: identifying the first real server in the buddy-sticky group, determining the buddy-real group to which the first real server belongs, and identifying the second real server in the buddy-real group.

9. The method of claim 7, wherein the buddy-sticky group and the buddy-real group are stored in a buddy-sticky data structure, and a buddy-real data structure, respectively.

10. One or more non-transitory tangible media encoding logic that includes instructions for execution and when executed by a processor, is operable to perform operations comprising:

associating a first real server with a first server farm attached to a first virtual Internet Protocol Address (VIP), wherein the first real server is configured to service a first connection from a client to the first VIP in a network environment;

associating a second real server with a second server farm attached to a second VIP, wherein the second real server is configured to service a second connection from the client to the second VIP in the network environment;

linking the first real server with the second real server in a particular group; and facilitating connection persistence of the first connection with the second connection across the first server farm and the second server farm, wherein the facilitating connection persistence comprises:

directing the first connection from the client to the first real server;

associating the particular group with the client through an entry in a sticky database;

receiving the second connection from the client;

identifying the particular group associated with the client, wherein the identifying comprises looking up the entry in the sticky database;

identifying the second real server belonging to the particular group; and directing the second connection to the second real server.

11. The media of claim 10, wherein the first real server and the second real server represent respective instantiations of a particular server at a first port and a second port of the particular server.

12. The media of claim 10, wherein the particular group comprises a buddy-sticky group and a buddy-real group, wherein the buddy-sticky group comprises the first server farm and the second server farm, and the buddy-real group comprises the first real server and the second real server.

13. The media of claim 12, wherein associating the particular group with the client comprises associating the buddy-sticky group with the client, wherein identifying the particular group associated with the client comprises identifying the buddy-sticky group associated with the client, wherein identifying the second real server belonging to the particular group comprises: identifying the first real server in the buddy-sticky group, determining the buddy-real group to which the first real server belongs, and identifying the second real server in the buddy-real group.

14. An apparatus, comprising:
a configuration manager;
a loadbalancer module;
a memory element for storing data; and
a processor that executes instructions associated with the data, wherein the processor and the memory element cooperate such that the apparatus is configured for:
associating a first real server with a first server farm attached to a first virtual Internet Protocol address (VIP), wherein the first real server is configured to service a first connection from a client to the first VIP in a network environment;
associating a second real server with a second server farm attached to a second VIP, wherein the second real server is configured to service a second connection from the client to the second VIP in the network environment;
linking the first real server with the second real server in a particular group; and
facilitating connection persistence of the first connection with the second connection across the first server farm and the second server farm, wherein the facilitating connection persistence comprises:
directing the first connection from the client to the first real server;
associating the particular group with the client through an entry in a sticky database;
receiving the second connection from the client;
identifying the particular group associated with the client, wherein the identifying comprises looking up the entry in the sticky database;
identifying the second real server belonging to the particular group; and
directing the second connection to the second real server.

15. The apparatus of claim 14, wherein the first real server and the second real server represent respective instantiations of a particular server at a first port and a second port of the particular server.

16. The apparatus of claim 14, wherein the particular group comprises a buddy-sticky group and a buddy-real group, wherein the buddy-sticky group comprises the first server farm and the second server farm, and the buddy-real group comprises the first real server and the second real server.

17. The apparatus of claim 16, wherein associating the particular group with the client comprises associating the buddy-sticky group with the client, wherein identifying the particular group associated with the client comprises identifying the buddy-sticky group associated with the client, wherein identifying the second real server belonging to the particular group comprises: identifying the first real server in the buddy-sticky group, determining the buddy-real group to which the first real server belongs, and identifying the second real server in the buddy-real group.

18. The media of claim 10, wherein the operations further comprise:
associating a third real server with the first server farm at the first VIP, wherein the third real server is configured to service the first connection to the first VIP, wherein the first connection is loadbalanced across the first real server and the second real server; and
linking the first real server, the second real server, and the third real server in the particular group.

19. The apparatus of claim 14, wherein the apparatus is further configured for:
associating a third real server with the first server farm at the first VIP, wherein the third real server is configured to service the first connection to the first VIP, wherein the first connection is loadbalanced across the first real server and the second real server; and
linking the first real server, the second real server, and the third real server in the particular group.

* * * * *